(12) United States Patent
Siu et al.

(10) Patent No.: US 12,544,254 B2
(45) Date of Patent: Feb. 10, 2026

(54) CONFIGURABLE TIME-DELAYED ORAL MANDIBLE POSITIONING DEVICE

(71) Applicant: S & V Siu Associates, LLC, Castro Valley, CA (US)

(72) Inventors: Stanley Chan Siu, Castro Valley, CA (US); Jeremy Aidan Siu, Milpitas, CA (US); Jusson Koo, Milpitas, CA (US)

(73) Assignee: S & V Siu Associates, LLC, Castro Valley, CA (US)

( * ) Notice: Subject to any disclaimer, the term of this patent is extended or adjusted under 35 U.S.C. 154(b) by 578 days.

(21) Appl. No.: 18/070,939

(22) Filed: Nov. 29, 2022

(65) Prior Publication Data

US 2023/0165705 A1 Jun. 1, 2023

Related U.S. Application Data

(60) Provisional application No. 63/283,919, filed on Nov. 29, 2021.

(51) Int. Cl.
*A61F 5/56* (2006.01)

(52) U.S. Cl.
CPC .................................. *A61F 5/566* (2013.01)

(58) Field of Classification Search
CPC ...... A61F 5/56; A61F 5/566; A61F 2005/563; A61C 7/08; A61C 7/36; A61C 7/00; A61C 9/00; A61C 3/00
USPC ........................................................ 128/848
See application file for complete search history.

(56) References Cited

U.S. PATENT DOCUMENTS

| 9,050,198 | B2 | 6/2015 | Cullen |
| 2011/0259345 | A1* | 10/2011 | Cullen ................ A61F 5/566 433/214 |
| 2020/0237551 | A1* | 7/2020 | Sharma ................ A61F 5/566 |

FOREIGN PATENT DOCUMENTS

| KR | 101080463 | 10/2011 |
| KR | 101295521 B1 * | 8/2013 ............. A61F 5/566 |
| KR | 102066677 | 1/2020 |
| KR | 20210095440 | 8/2021 |

OTHER PUBLICATIONS

Translation of KR-101295521-B1 (Year: 2013).*

* cited by examiner

*Primary Examiner* — Daniel A Miller
(74) *Attorney, Agent, or Firm* — Matthew A. Pequignot; Pequignot + Myers

(57) ABSTRACT

A configurable time-delayed oral mandible displacement device includes a top member and a bottom member, the bottom member slidably coupled to the top member for movement between a non-extended position and an extended position. A control mechanism is coupled between the top member and the bottom member for controlling extension of the bottom member. The control mechanism an element fabricated from a shape memory material. The control mechanism further includes a heat-transfer control portion providing configurability by variation of a characteristic thereof. The configurability allows for controllably selecting a duration of an activation time delay, during which the temperature of the element fabricated from shape memory material increases to an activation temperature by absorbing body heat from a human wearer after the device is inserted into the mouth of the human wearer.

26 Claims, 19 Drawing Sheets

CONFIGURABLE TIME-DELAYED ORAL MANDIBLE POSITIONING DEVICE

CROSS-REFERENCE TO RELATED APPLICATIONS

This application claims the benefit of U.S. Provisional Application No. 63/283,919, filed on Nov. 29, 2021.

FIELD OF THE INVENTION

The instant disclosure relates generally to oral appliances, and more particularly to a configurable time-delayed oral mandible displacement device for sleep apnea and snoring.

BACKGROUND

Sleep apnea is a well-known condition that impacts millions globally. The cessation of breathing or excessive blockage of the breathing airways typically causes snoring, but the more concerning impact is that apnea impairs and interrupts normal sleep patterns. Besides the poor sleep degrading a person's productivity, apnea has the more serious impact of causing or exacerbating health conditions such as high blood pressure, heart disease, and diabetes.

Treatment or remedies for sleep apnea range from the use of continuous positive airway pressure (CPAP) machines, which force air into the sufferer's air passage, to surgical methods to widen the air passage. Disadvantages of CPAP machines include the need for a reliable source of power, noise production during operation, and being uncomfortable to wear. Surgical methods expose the sufferer to the normal risks that are associated with surgery, may require a long recovery time, and are wasteful of limited hospital resources.

Oral mandible positioning devices, which cause the sufferer to sleep with their lower jaw extended forward with respect to their upper jaw, have thus far been only moderately effective in controlling sleep apnea. These devices work by moving the lower jaw forward to enlarge the breathing airways in the nasal cavity area and thereby reduce the restriction that causes snoring and apnea. Although there are many oral mandible devices on the market, most of these devices have their configuration, or jaw forward displacement distance, preset prior to insertion into the mouth. The displacement needed to reduce snoring or apnea is typically enough to cause discomfort to the wearer of the device. The discomfort is sometimes enough to keep the user from falling asleep resulting in the user not using the device.

Some attempts have been made to provide oral mandible positioning devices that are more comfortable to wear. For example, Korean patent application publication 20210095440, by Kim Jeong Whun et al., discloses an automatic mandibular advancement device in which a power source is used to periodically provide power to a shape memory alloy spring. The spring lengthens when power is being applied to it and thereby extends a mandible positioning member relative to a maxillary support member. When power is removed the spring returns to its original shape and a return spring exerts a force to return the mandible positioning member to its original position. A controller is used to provide and remove the power at predetermined times, for example every five seconds. When the mandible positioning member is moved forward the user's lower jaw is guided to a position in which breathing is improved, but also in which the user's jaw is stressed. The stress on the user's jaw is relieved when the mandible positioning member returns to its initial position. Unfortunately, there are serious safety concerns associated with placing an electronically controlled device, containing a battery, into the user's mouth for eight or more hours each day. Additionally, some users will find the nearly continuous movement to be uncomfortable and may have difficulty falling asleep or may wake up at various times during the night.

It would therefore be beneficial to provide an improved mandible displacement device that overcomes or reduces at least some of the above-mentioned disadvantages.

SUMMARY OF EMBODIMENTS

In accordance with at least one aspect there is provided an oral mandible displacement device that is designed to provide comfort to the user while still applying sufficient force to move the lower jaw forward and reduce or relieve the effects of airway blockage and hence, snoring and/or apnea.

In accordance with at least one aspect the device has a moldable upper and lower portion, such as for instance a moldable gel, that molds to the user's teeth and a frame with upper and lower plates that hold the gel of the moldable upper and lower portions.

In accordance with at least one aspect the device allows displacement of the wearer's lower jaw using a spring or other suitable mechanism for displacement, and a screw-type mechanism to control maximum displacement.

In accordance with at least one aspect the device addresses the major issue of initial discomfort after being inserted into the wearer's mouth by employing a shape memory material (SMM) spring to produce the force that is necessary for lower jaw displacement. Two specific and non-limiting examples include a shape memory alloy (SMA) spring or a shape memory polymer (SMP) spring. The device is configurable to provide an activation delay of desired duration such that the lower jaw is not displaced until after the wearer has fallen asleep, at which time the discomfort caused by the lower jaw displacement is not strongly felt by the wearer.

The device is configurable to provide an activation delay of at least five minutes. The device is configurable to provide a different activation delay for different users. The device is configurable to have an activation delay of between 5 minutes and 90 minutes, preferably between 10 minutes and 60 minutes, and more preferably between 15 minutes and 40 minutes.

The device is configurable to provide a desired activation delay upon being inserted into a heat space having a temperature between about 35° C. and 40° C., preferably between about 36.1° C. and 37.2° C. During use, the heat space is the mouth of a human wearer.

In accordance with at least one aspect the device is in a non-displaced (zero) or non-extended position when the wearer inserts the device into their mouth. As the device heats to near body temperature, the SMM spring begins to activate and causes the lower plate of the device to displace relative to the upper plate, such that the wearer's lower jaw is forced forward. The time delay between the initial insertion and device activation allows time for the wearer to fall asleep. In particular, the SMM spring activation is designed to occur during sleep.

In accordance with at least one aspect the device has a lead screw mechanism to adjust the maximum displacement the bottom plate can move relative to the top plate upon activation of the SMM spring. The adjustable displacement can range from 0 to 0.5 inches for a typical sized device, but for larger mouths, the range can be around 0 to 1 inch. The displacement is set by the wearer who would adjust the displacement to a level that gives the best reduction in apnea while still being comfortable.

In accordance with at least one aspect the device has two layers of heat conforming gel, one gel layer for the maxillary (upper) dentition and one gel layer for the mandibular (lower) dentition.

In accordance with at least one aspect the setting of the gel to conform to the wearer's teeth shape can be achieved by placing the device in hot water (near boiling) to soften the gel. The device is then carefully inserted into the wearer's mouth (once cooled sufficiently) and the wearer then bites down on the gel layers to form a custom mold for their teeth. As will be apparent, placing the device in hot water is expected to activate the SMM spring. The screw-type mechanism (used for setting maximum displacement during normal use) can be set to lock the lower plate in place in its non-extended condition until after the mold has set and the device is ready for use. However, for some wearers the best fit occurs when the device is extended to the wearer's desired setting before being inserted into the wearer's mouth. In this case, the screw-type mechanism is set to permit the lower plate to extend when the device is placed into hot water, and the wearer bites down on the gel layers with the device in its extended condition.

In accordance with at least one aspect the activation delay can be configured, tailored, or otherwise adjusted for the wearer by encapsulating and/or enclosing the SMM spring with various materials that can either slow or speed up the time that is required for the SMM spring to warm up to its activation temperature and activate to change shape. Encapsulating the spring in a high thermal load material, insulator, or combination of both will slow the time for the spring to reach the activation temperature as the spring relies on body heat that is absorbed from the user's mouth to warm and activate the spring. Reducing the thermal load around the SMM spring or using material that is more thermally conductive near the SMM spring will reduce the time needed for the SMM spring to activate. In this way, shorter activation times (e.g., as short as five minutes) can be provided for those wearers that tend to fall asleep quickly and longer activation times (e.g., as long as 30-60 minutes) can be provided for those wearers that tend to fall asleep more slowly.

In accordance with at least one aspect the SMM spring is a helical spring. In accordance with other aspects the SMM spring may be a flat as the design and space requirement necessitate.

In accordance with at least one aspect the device may include a ratchet and release mechanism, or another suitable locking and release mechanism, to lock the device in its extended configuration with the lower plate displace forwardly of the upper plate. After the SMM spring activates, the ratchet or other suitable locking mechanism will stop or prevent the plate from sliding back if the wearer's jaw tries to force the displacement back toward zero. The release mechanism enables the device to be reset to the zero-displacement position for the next sleep.

In accordance with at least one aspect a temperature-controlled storage device can be used to cool the oral appliance prior to use and to facilitate setting the device to its zero-displacement position. The temperature-controlled storage device is advantageous in warmer environments, in which the ambient temperature may be above the activation temperature of the SMM spring. The temperature-controlled storage device can also be used to lower the oral appliance's temperature initial temperature prior to being inserted into the wearer's mouth to lower than the ambient temperature and thereby increase the activation delay time. Further, the temperature-controlled storage device can be used to lower the oral appliance's temperature to a known initial value to ensure that the same temperature increase, and therefore the same activation delay time, will be required during each sleep before the SMM spring activates and the lower plate moves to its extended position.

In accordance with an aspect of at least one embodiment there is provided a configurable time-delayed oral mandible displacement device, comprising: a top member and a bottom member, the bottom member slidably coupled to the top member for movement between a non-extended position and an extended position; and a control mechanism coupled between the top member and the bottom member, the control mechanism comprising: an element fabricated from a shape memory material; and a heat-transfer control portion providing configurability by variation of a characteristic thereof for controllably selecting a duration of an activation time delay during which the temperature of the element fabricated from shape memory material increases to an activation temperature thereof by absorbing body heat from a human wearer after the device is inserted into the mouth of the human wearer.

In accordance with an aspect of at least one embodiment there is provided a configurable time-delayed oral mandible displacement device, comprising: a top member; a bottom member slidingly coupled to the top member for supporting a sliding movement of the bottom member relative to the top member along a displacement direction between a non-extended position and an extended position; and a control mechanism coupled between the top member and the bottom member, the control mechanism comprising a shape memory alloy portion that is at least partially contained within a heat-transfer control portion of the control mechanism, the shape memory alloy portion configured to activate upon warming to an activation temperature thereof by absorbing body heat from a human wearer of the device, wherein activation of the shape memory element includes a change of shape that provides a force for extending the bottom member from the non-extended position to the extended position, and wherein the heat-transfer control portion provides configurability by varying a characteristic thereof for controlling a duration of an activation time delay during which the temperature of the shape memory alloy portion increases to the activation temperature after the device is inserted into the mouth of the human wearer.

In accordance with an aspect of at least one embodiment there is provided a configurable time-delayed oral mandible displacement device, comprising: a top member and a bottom member slidably coupled to the top member; and an actuator disposed between the top member and the bottom member, the actuator comprising a shape memory material that is configured to provide an actuating force for slidingly extending the lower member relative to the top member upon warming of the shape memory material to an activation temperature thereof by absorbing body heat from a human user over a time period of at five minutes after being inserted into the mouth of the human user.

In accordance with an aspect of at least one embodiment there is provided a configurable time-delayed oral mandible displacement device, comprising: a top member; a bottom member slidingly coupled to the top member for supporting a sliding movement of the bottom member relative to the top member along a displacement direction between a non-extended position and an extended position; and a control mechanism disposed between the top member and the bottom member, the control mechanism comprising a shape memory alloy portion that is at least partially contained within a heat-transfer control portion of the control mechanism, the shape memory alloy portion configured to activate upon warming to an activation temperature thereof by absorbing body heat from a human user, wherein activation of the shape memory element includes a change of shape for at least one of unlocking and displacing the bottom member from the non-extended position, wherein the heat-transfer control portion provides configurability by varying a characteristic thereof for controlling a duration of an activation time delay during which the temperature of the shape memory alloy portion increases to the activation temperature after the device is inserted into the mouth of the human user.

BRIEF DESCRIPTION OF THE DRAWINGS

Exemplary embodiments will be described in accordance with the drawings, which are not drawn to scale, and in which.

DETAILED DESCRIPTION OF THE DRAWINGS

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

1. Definitions

The terms "top," "bottom," "upper," "lower," "front," "rear" and similar relative terms are used only for convenience when describing the various embodiments as they are oriented in the accompanying drawings.

"Shape memory material"-includes shape memory alloys, shape memory polymers, shape changing polymers and the like. A one-way shape memory material is one that can be deformed when cooled and returns to its pre-deformed ("remembered") shape when warmed. When the one-way shape memory material cools again, it will retain its shape until deformed again. Cooling from high temperature to low temperature does not cause a one-way shape memory material to return to another "remembered" shape. A two-way shape memory material "remembers" two different shapes: one at low temperature and one at high temperature. When cooled the material returns to its "remembered" low temperature shape without requiring deformation and when heated the material returns to its "remembered" high temperature shape. Shape memory materials also includes three-way shape memory materials.

2. Exemplary Device

Figure 1A:
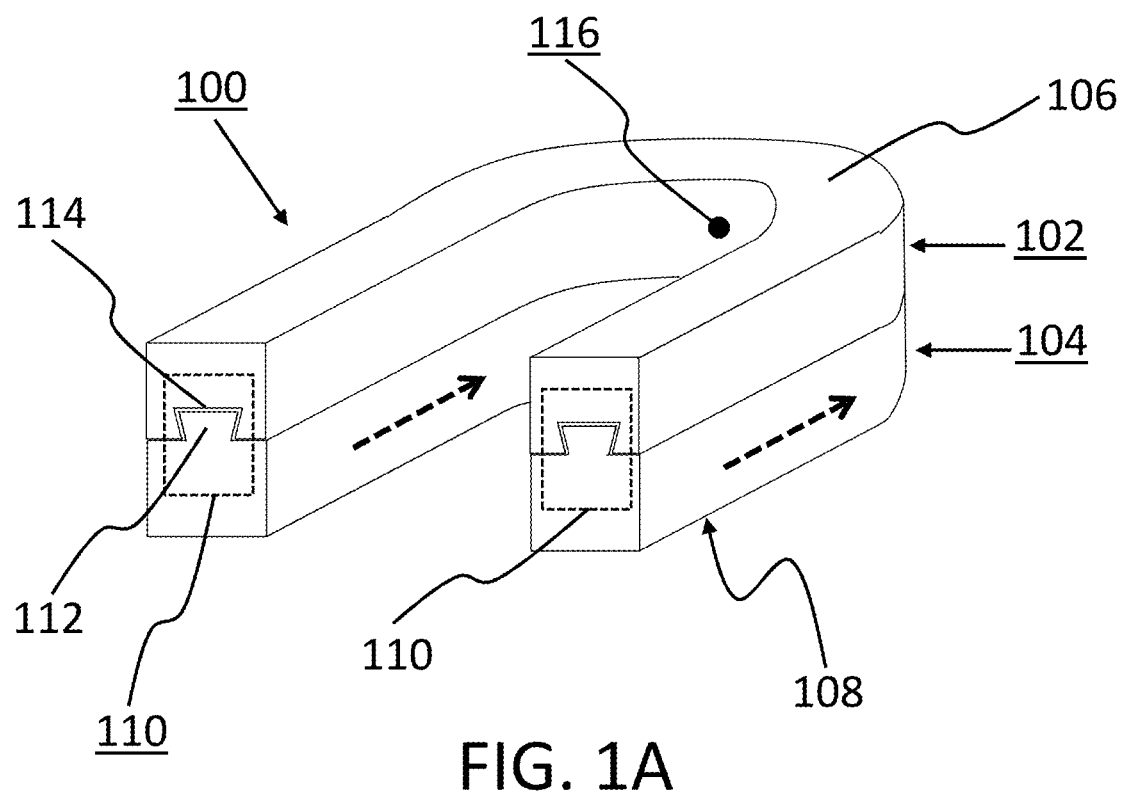
FIG. 1A is simplified rear isometric view of a configurable time-delayed oral mandible displacement device.

Referring to FIG. 1A, shown is a simplified rear isometric view of an exemplary, configurable time-delayed oral mandible displacement device 100. The device 100 includes a top plate 102, also referred to equivalently as a top member 102. The device 100 further includes a bottom plate 104, also referred to equivalently as a bottom member 104. In the embodiment that is illustrated in FIG. 1A, both the top plate 102 and the bottom plate 104 are substantially U-shaped to match the dentition of a wearer of the device, also referred to equivalently as a user or as a human user. The top plate 102 and the bottom plate 104 may be fabricated using any material that is generally suitable for use in oral appliance applications, such as for instance medical grade PVC or Polyethylene, PEEK, Polycarbonate, Polypropylene and Polyurethane, etc.

The top plate 102 has an upper surface 106 for receiving the maxillary dentition of the wearer and the bottom plate 104 has a lower surface 108 for receiving the mandibular dentition of the wearer. The upper surface 106 and the lower surface 108 are each provided with a (not illustrated in FIG. 1A) layer of moldable gel. During a fitting procedure, the moldable gel is softened by heating and the wearer bites down on the gel layers to create an impression therein matching their unique dental structure. After hardening, the impressions formed in the gel layers are precisely matched to the wearer's dental structure, forming a close fit therebetween, which acts to secure the device 100 within the wearer's mouth. The moldable gel is any moldable gel that is suitable for use in creating dentition impressions in oral appliances, such as for instance ethylene-vinyl acetate, commonly known as EVA.

Referring still to FIG. 1A, the top plate 102 and the bottom plate 104 are slidingly coupled together for supporting a sliding movement of the bottom plate 104 relative to the top plate 102 along a displacement direction, which is indicated by the dashed arrows. FIG. 1A shows the device 100 in a configuration that is intended for being inserted into the mouth of the wearer, in which the bottom plate 104 is in a non-extended position relative to the top plate 102. During use, after being inserted into the wearer's mouth, the device 100 is activated and the bottom plate 104 extends along the displacement direction. The top plate 102 is held in place by the wearer's mandibular dentition, which does not move relative to the rest of the wearer's skull. Thus, movement of the bottom plate 104 relative to the top plate 102 along the displacement direction causes the wearer's lower jaw to also move forward and into a position in which the breathing airways in the wearer's nasal cavity area become enlarged.

The device 100 shown in FIG. 1A further includes a coupling and actuation portion that is shown generally within the dashed line box 110, which includes a control mechanism capable of being configured to provide different activation times. In this specific and non-limiting example, each arm of the generally U-shaped bottom plate 104 includes a rail 112 extending along the displacement direction and each arm of the generally U-shaped top plate 102 includes a groove 114 extending along the displacement direction. Each rail 112 is configured to slide within a complementary shaped groove 114, thereby permitting relative motion between the top plate 102 and the bottom plate 104 along only one direction. In FIG. 1A, each rail 112 and each groove 114 has a shape that is generally an isosceles trapezoid in a cross-section taken in a plane perpendicular to the displacement direction. Of course, other configurations of the rails 112 and grooves 114 may be envisaged, and other suitable systems for slidingly coupling the top plate 102 and the bottom plate 104 may be substituted for the illustrated rails 112 and grooves 114. The maximum displacement of the bottom plate 104 relative to the top plate 102 is limited using an adjustment mechanism, such as for instance a screw-adjustment mechanism shown partially at 116 and described in greater detail below with reference to FIGS. 2A-2C.

Figure 1B:
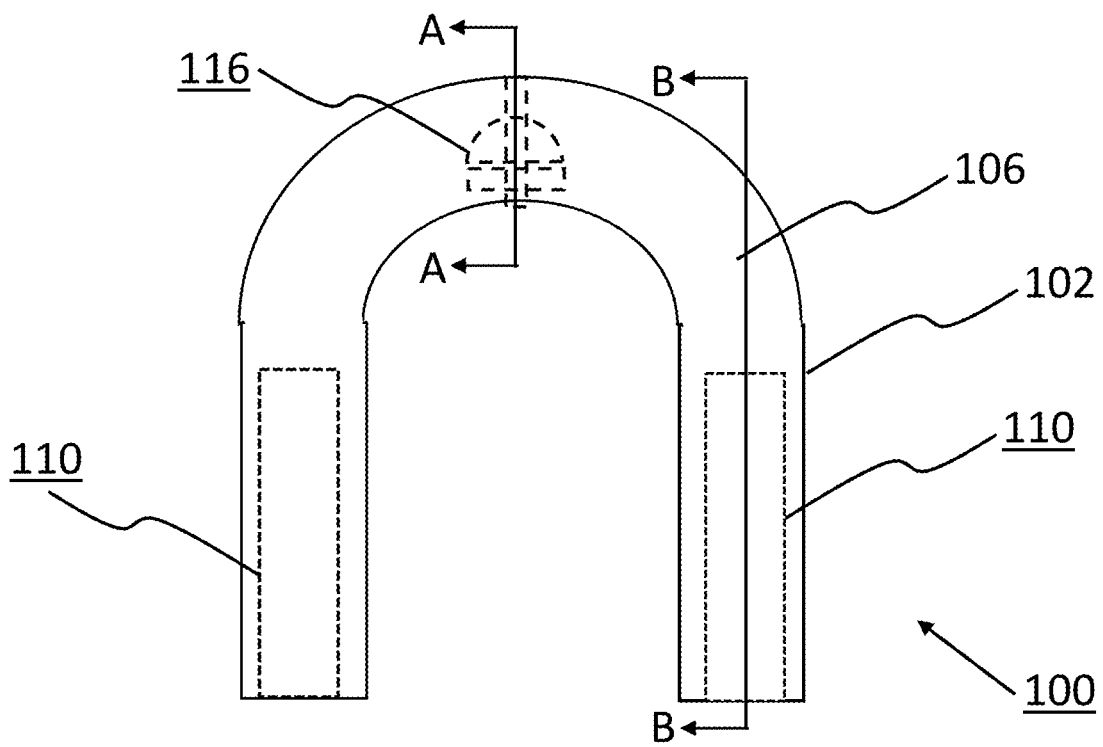
FIG. 1B is a simplified top view of the device of FIG. 1A.

FIG. 1B is a simplified top view of the device 100 in its non-extended condition. The dashed line box 110 illustrates the general location of the coupling and actuation portion of FIG. 1A, which is arranged along the facing surfaces of the top plate 102 and of the bottom plate 104. The screw-adjustment mechanism 116, which is disposed between the top plate 102 and the bottom plate 104, is shown using dashed lines in FIG. 1B.

Figure 2A:
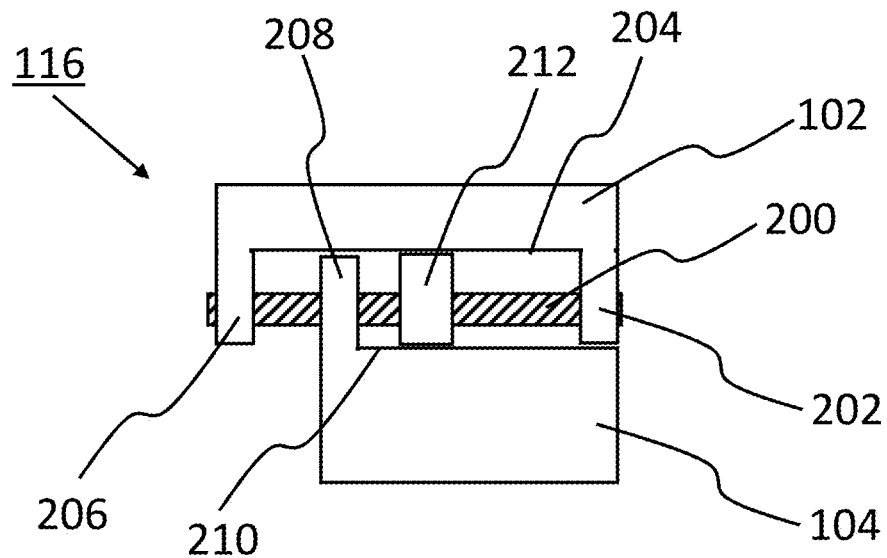
FIG. 2A is a simplified cross-sectional view taken along the line A-A in FIG. 1A and showing the screw-adjustment mechanism when the device in its non-extended condition.
Figure 2B:
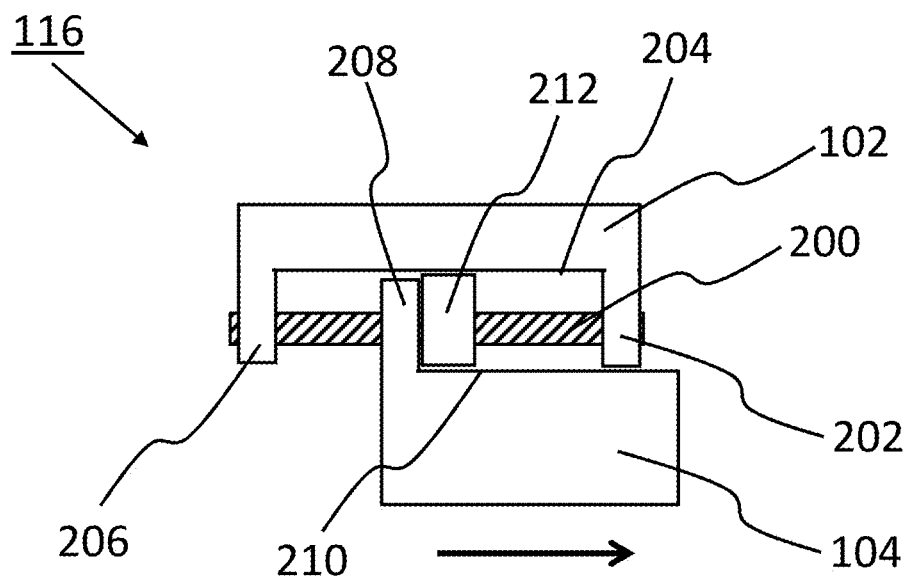
FIG. 2B is a simplified cross-sectional view showing the screw-adjustment mechanism of FIG. 2A when the device is in its extended condition.

Referring now to FIG. 2A and FIG. 2B, shown are cross-sectional views taken along the line A-A of FIG. 1B, showing the screw-adjustment mechanism 116 when the device 100 is in its non-extended condition and when the device 100 is in its extended condition, respectively. The screw-adjustment mechanism 116 includes a threaded screw 200 that is retained within respective openings, at least some of which are also threaded, formed through a first post 202 extending from a lower surface 204 of the top plate 102, a second post 206 extending from the lower surface 204 of the top plate 102, and a third post 208 extending from the upper surface 210 of the bottom plate 104. An adjustment block 212 moves along the length of the threaded screw 200 when the threaded screw 200 is turned. As shown in FIG. 2B, when the bottom plate 104 is displaced along the displacement direction indicated by the arrow, the adjustment block 212 and the third post 208 extending from the upper surface 210 of the bottom plate 104 come into contact one with the other and thereby prevent further displacement of the bottom plate 104 along the displacement direction.

Figure 2C:
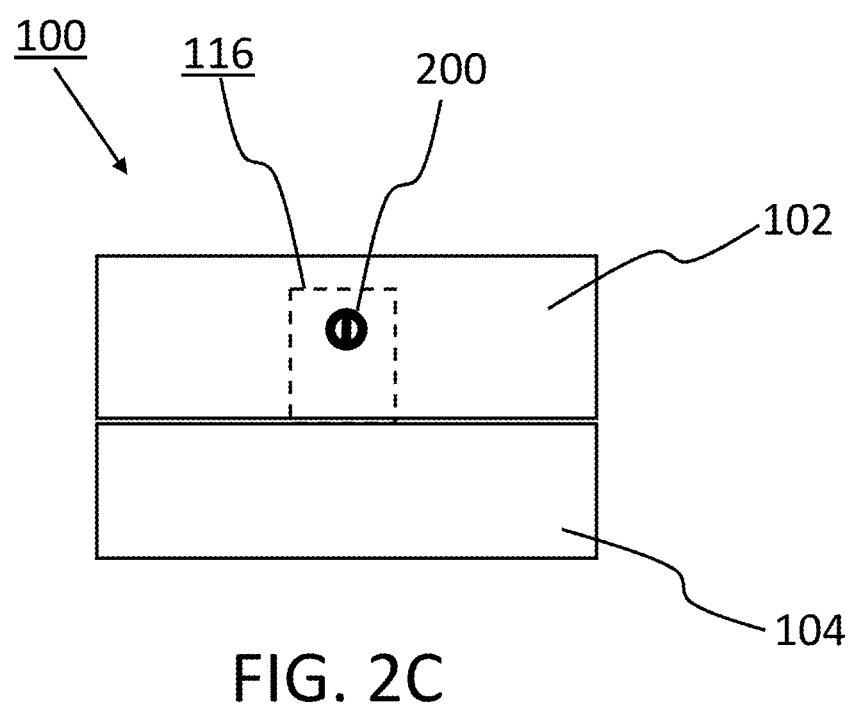
FIG. 2C is a simplified front view of the device of FIG. 1A.

Referring now to FIG. 2C, shown is a simplified front view of the device 100. Certain features have been omitted in FIG. 2C for improved clarity, such as for instance vent slots that may be provided to improve airflow. The end of the threaded screw 200 of the screw-adjustment mechanism 116 is preferably accessible and provided with a feature such as a slot-shaped recess or an X-shaped recess for allowing the wearer to adjust the screw-adjustment mechanism 116 using e.g., a slot screwdriver or a Philips screwdriver, etc. The wearer may desire to adjust the screw-adjustment mechanism 116 for comfort, including an initial adjustment when the device is new and from time-to-time thereafter if the device starts to become uncomfortable to wear.

Figure 3A:
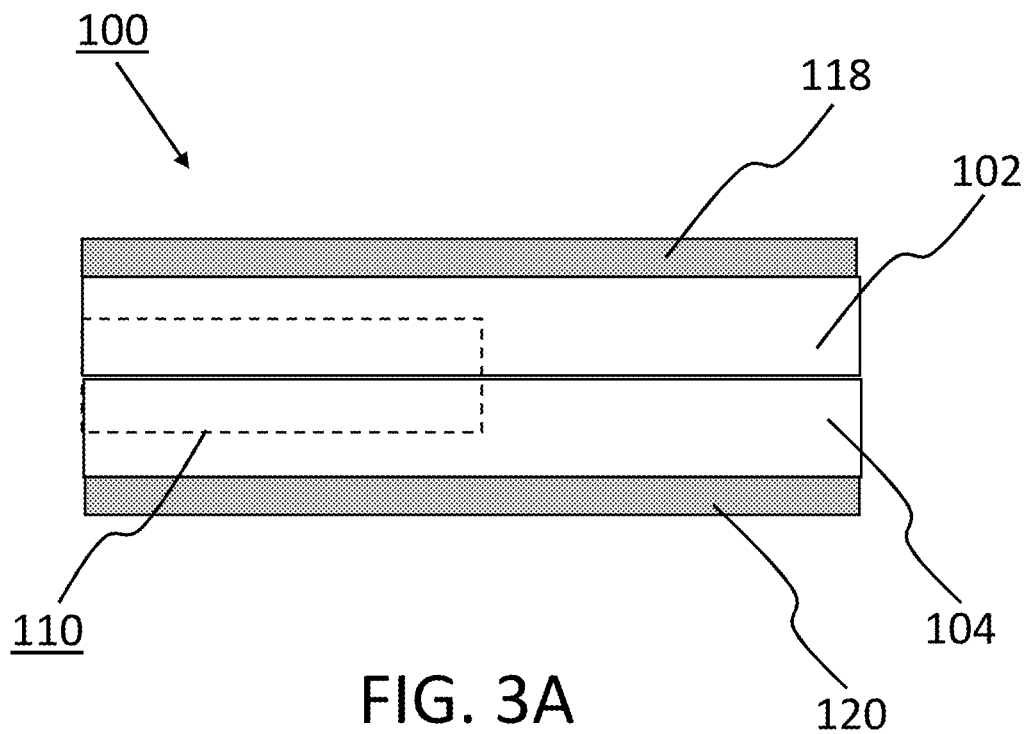
FIG. 3A is a simplified side view of the device of FIG. 1A in its non-extended condition.
Figure 3B:
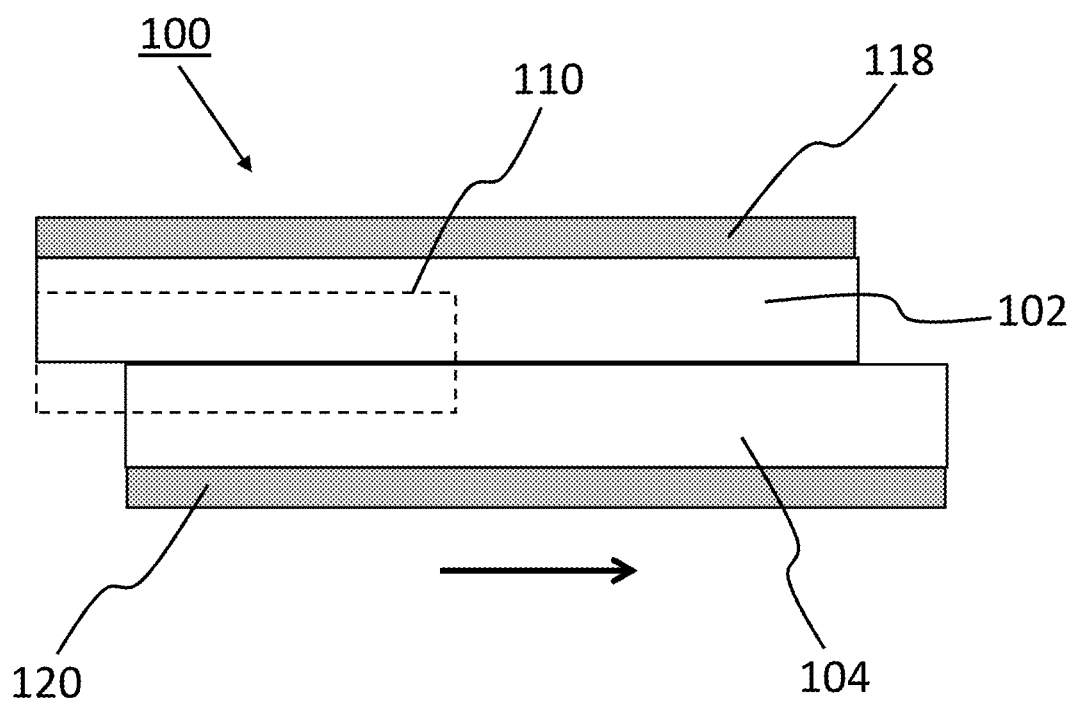
FIG. 3B is a simplified side view of the device of FIG. 1A in its extended condition.

FIG. 3A is a simplified side view showing the device 100 in its non-extended condition. The front surface of the top plate 102 and the front surface of the bottom plate 104 are generally aligned in the non-extended condition, which minimizes the size of the device to facilitate insertion into the mouth of the wearer. Optionally, the bottom plate 104 extends slightly forward of the top plate 102 along the displacement direction when the device is in its non-extended condition, which reduces the distance of travel of the bottom plate when the device 100 is activated and may be less disturbing to some wearers. FIG. 3B is a simplified side view showing the device 100 in its extended condition. As discussed with reference to FIGS. 2A and 2B, the maximum displacement of the bottom plate 104 relative to the top plate 102 is limited using a suitable adjustment mechanism, such as for instance screw-adjustment mechanism 116 (not illustrated in FIG. 3B).

FIG. 3A. and FIG. 3B also show a first layer of moldable gel 118 arranged along the upper surface 106 of top plate 102 and a second layer of moldable gel 120 arranged along the lower surface 108 of the bottom plate 104. As discussed above with reference to FIG. 1A, the first layer of moldable gel 118 and the second layer of moldable gel 120 are heated during an initial fitting step, and the wearer subsequently bites down on the softened gel to create impressions of the maxillary and mandibular dentition, respectively. For better clarity, the first layer of moldable gel 118 and the second layer of moldable gel 120 have been omitted in the remaining figures.

3. Operation

Device 100 is a configurable time-delayed oral mandible displacement device for sleep apnea and snoring. The coupling and actuation portion indicated generally at 110, which includes a control mechanism for providing a desired activation delay time, has already been described above in general terms. Structure, such as for instance rails 112 and grooves 114, is provided for slidingly coupling the top plate 102 and the bottom plate 104. In addition, the control mechanism of the coupling and actuation portion 110 includes at least an element for storing potential energy for providing the force that is required to displace the bottom plate 104 relative to the top plate 102, a specific and non-limiting example being a spring. Further, the control mechanism is configurable to allow the selection of a desired activation delay between the time the device 100 is inserted into the wearer's mouth in its non-extended condition and the time the bottom plate 104 moves along the displacement direction relative to the top plate 102 such that the device 100 is in its extended condition. Various control mechanisms, which are suitable for providing the described functionality, are discussed in the following sections and are merely some specific and non-limiting examples. Other control mechanisms may be envisaged without departing from the scope of the invention.

4. First Control Mechanism

Figure 4A:
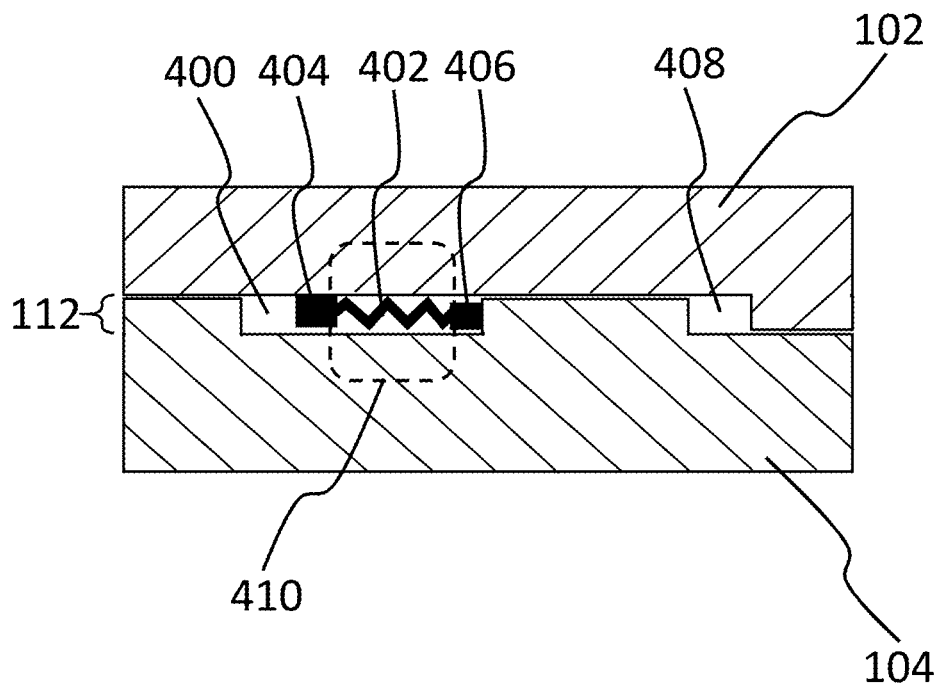
FIG. 4A is a simplified cross-sectional view taken along the line B-B in FIG. 1A and showing a first control mechanism in accordance with an embodiment, when the device is in its non-extended condition.

Referring now to FIG. 4A, shown is a cross-sectional view of device 100 taken along line B-B in FIG. 1B, with a first control mechanism in accordance with an embodiment, and when the device 100 is in its non-extended condition. As shown in FIG. 4A, the rail 112 extending from the upper surface of bottom plate 104 is non-continuous and includes a gap 400. Disposed within gap 400 is an element for storing potential energy in the form of a spring fabricated from a shape memory material (SMM), i.e., SMM spring 402. SMM spring 402 may be fabricated from a shape memory alloy, a shape memory polymer, a shape change polymer etc., and the material may be a one-way SMM, a two-way SMM or a three-way SMM, etc. Nitinol, a binary alloy of titanium with 45% to 50% nickel is one example of a SMM that can have an activation temperature in the body temperature range and provide sufficient spring energy for this device. Nitinol can be a one-way or two-way SMM. Polymers such as IPDI-PCL-BDO, POSS-PDLLA-co-CL, and MM3520 from SMP Technologies are polymers with SMM characteristics, such as body temperature activation temperature, that may be used in this device.

Referring still to FIG. 4A, the SMM spring 402 is attached to the top plate 102 via attachment point 404 and is attached to the bottom plate 104 via attachment point 406. A gap 408 is provided between the top plate 102 and the bottom plate 104 to allow room for the bottom plate 104 to slide along the displacement direction relative to the top plate 102. During use, the device 100 is cooled below an activation temperature of the SMM spring 402 and is subsequently inserted into the mouth of a wearer in its non-extended condition shown in FIG. 4A. Body heat from the wearer, which on average is between about 36.1° C. and 37.2° C., warms the material of the device 100, including the SMM spring 402. When the SMM spring 402 warms to its activation temperature, it "remembers" its previously programmed high temperature shape and activates, thereby causing the distance between the attachment points 404 and 406 to increase as the SMM spring lengthens in this specific example. As a result, the bottom plate 104 is displaced forwardly with respect to the top plate 102, causing the device to be in its extended condition as shown in FIG. 4B, in which gaps 400 and 408 are both reduced in size.

Figure 4B:
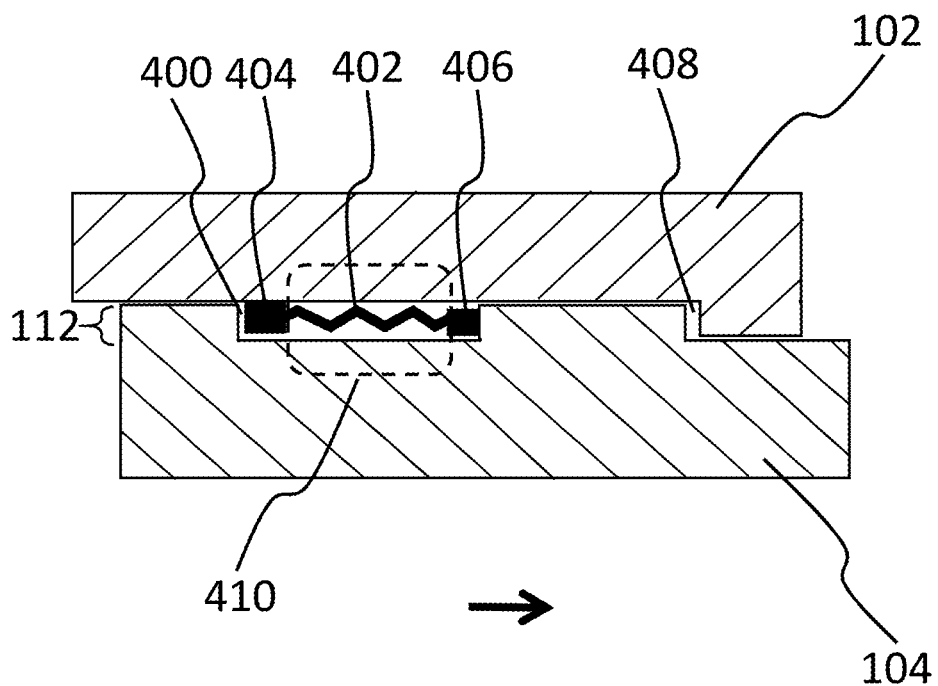
FIG. 4B is simplified a cross-sectional view showing the first control mechanism of FIG. 4A when the device is in its extended condition.

Now referring to FIG. 4A and FIG. 4B, a heat transfer control portion is indicated generally at 410 using a dashed-line rounded rectangle. The heat transfer control portion 410 is configurable to affect the rate at which body heat from the wearer's mouth is absorbed by the SMM spring 402, and thereby allowing the device 100 to be configured for different activation times for different wearers. For instance, the heat transfer control portion 410 is configured to slow the rate of heat transfer if the wearer takes longer to fall asleep, or the heat transfer control portion 410 is configured to maximize the rate of heat transfer if the wearer takes less time to fall asleep. Various modifications to the heat transfer control portion 410 may be selected to tailor the rate of heat transfer to produce an activation delay time that is suitable for a wide range of wearer's requirements.

The heat transfer control portion 410 may include a separate enclosure that partially or completely surrounds or contains the SMM spring 402. The material used to fabricate such a separate enclosure and/or a material thickness of at least a portion of the separate enclosure and/or a medium contained within the separate enclosure may be varied to produce a desired heat transfer rate and accordingly to provide a desired activation delay. In some embodiments, the separate enclosure may be adjacent to the SMM spring 402 along only one side thereof, or it may partially or completely enclose the SMM spring 402.

In some embodiments the separate enclosure may be fabricated from a metal to provide higher thermal conduction. Some non-limiting examples of suitable metals include various titanium alloys including Grade 5 Titanium alloy (Ti-6Al-4V) which is used for implants and dental appliances. The metal may be made to be porous to adjust the effective thermal conductivity. Alternatively, a ceramic, porous ceramic, insulating polymer such as Styrofoam®, or other material may be used to decrease the thermal conductivity or thermal load for longer activation delay of the SMM spring 402. Some non-limiting examples of ceramics are alumina and zirconia. The material thickness of different portions of the wall of the separate enclosure may also be different.

In some embodiments the separate enclosure may be formed using a flexible, liquid-tight polymer such as poly-vinylidene chloride, i.e., a plastic film/membrane. In such embodiments, the enclosure preferably contains a material that is selected to affect the rate at which the wearer's body heat is transferred to the SMM spring 402. The material may be any suitable gas, liquid, gel, or a solid insulating material, such as for instance Styrofoam® beads. The enclosure is flexible and changes shape as the SMM spring 402 expands or contracts along the displacement direction. Various configurations are discussed in more detail with reference to FIGS. 11A-11H and FIGS. 12A-12D.

In some embodiments the material or material thickness used in the top plate 102 and/or bottom plate 104 is part of the heat transfer control portion 410 and is selected to control the rate of heat transfer. Optionally, portions of the top plate 102 and/or bottom plate 104 proximate the SMM spring 402 include structures for receiving inserts fabricated from a material that can be selected to provide a desired heat transfer rate.

After the wearer removes the device 100 from their mouth, it must be reset back to its non-extended condition before the next sleep. The SMM spring 402 must be cooled below its activation temperature before it can be deformed, and the device returned its non-extended condition. When the SMM spring 402 is fabricated using a one-way shape memory material, an external force must be applied to slide the bottom plate 104 back to the non-extended condition. When the SMM spring 402 is fabricated from a two-way shape memory material, the SMM spring 402 will "remember" its low temperature shape upon sufficient cooling and the bottom plate 104 will slide back to the non-extended condition absent application of an external force, or with only a relatively small external force. In cooler climates the ambient temperature may be sufficiently below the activation temperature to cool the SMM spring 402 such that the device 100 can be reset to its non-extended condition without requiring supplemental cooling. In warmer climates and/or for devices that are configured for very slow heat transfer and long activation delay times, a temperature-controlled storage device may be required to cool the device 100 sufficiently and/or more quickly than is possible under ambient conditions. The temperature-controlled storage device may include a chilled enclosure for storing the device 100, and optionally the enclosure contains a chilled liquid which may be a cleaning/sanitizing liquid for the device 100.

In sum, the heat transfer control portion 410 may include portions of the top plate 102, portions of the bottom plate 104, and/or other separate components that may be incorporated into device 100. By varying the shape, thickness, composition, arrangement etc. of the various portions and components as described above, it is possible to place materials between the SMM spring 402 and the wearer to control the rate at which body heat from the wearer is transferred to and subsequently absorbed by the SMM spring 402. Since body temperature is substantially constant from one wearer to another, and assuming a standard initial temperature of the device 100 as obtained e.g., using a temperature-controlled storage device, it is possible to select an appropriate configuration of the heat transfer control portion 410 to provide activation delay times over a wide range of values. In general, a minimum activation delay time for device 100 is 5 minutes. Wearer-specific activation delay times may be in the range between 5 minutes and 90 minutes, preferably between 10 minutes and 60 minutes, and more preferably between 15 minutes and 40 minutes.

5. Second Control Mechanism

Figure 5A:
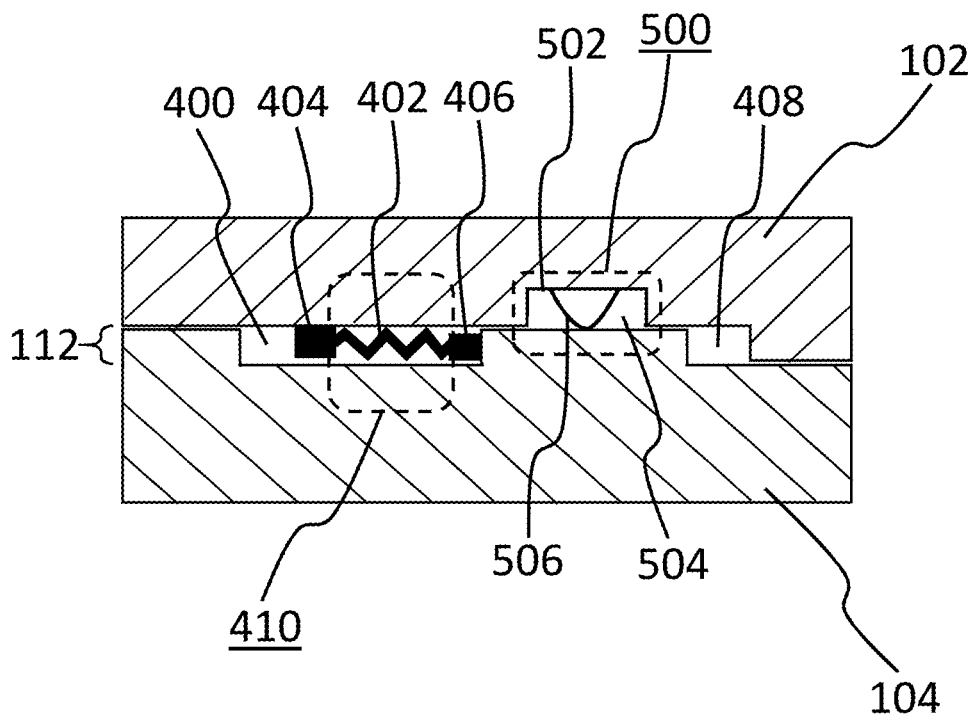
FIG. 5A is a simplified cross-sectional view taken along the line B-B in FIG. 1A and showing a second control mechanism in accordance with another embodiment, when the device is in its non-extended condition.

Referring now to FIG. 5A, shown is a cross-sectional view of device 100 taken along line B-B in FIG. 1B, with a second control mechanism in accordance with an embodiment, and when the device 100 is in its non-extended condition. The elements of the second control mechanism include the same elements that have already been described with reference to FIG. 4A and FIG. 4B, and additionally include a locking mechanism shown generally at 500. During use, the locking mechanism 500 can be reset when the device 100 is returned to its non-extended condition after being worn by the wearer. When reset, i.e., in an engaged condition, the locking mechanism 500 locks the device 100 in its non-extended condition.

In this specific and non-limiting example, the locking mechanism 500 is disposed within a recess 502 that is formed in the groove 114 along the lower surface of the top plate 102. The recess 502 provides a space 504 to accommodate a lock-element 506 formed from a SMM, such as for instance a generally strip-shaped piece of SMM that is more strongly curved when it is below its activation temperature than when it is above its activation temperature. The lock-element 506 may be formed using the same material that is used to form SMM spring 402, or a different suitable shape memory material having an activation temperature close to average human body temperature may be used instead.

Optionally, the lock-element 506 is associated with a not illustrated heat-transfer control portion to provide an activation delay prior to activating, similar to the function of the already-described heat transfer portion 410. However, since the locking mechanism 500 in the current embodiment is intended primarily to hold the device 100 in its non-extended condition only until after the device 100 has been inserted into the wearer's mouth, in most cases it is not necessary to provide an activation delay prior to activation of the lock-element 506, or at least it is not necessary to provide a wearer-specific activation delay.

Referring still to FIG. 5A, when the lock-element 506 is in its low-temperature shape it is strongly curved, such that it applies a force against the top of the rail 112. Of course, alternative configurations may be envisaged in which the locking mechanism 500 presses one or more lock-elements 506 against one or both sides of the rail 112 instead of against the top of the rail 112, and/or in which the locking mechanism 500 presses lock-elements 506 against the rail 112 at more than one location. Regardless of the specific configuration of locking mechanism 500, the effect of the lock-element 506 pressing against the rail 112 is to create friction between the lock-element 506 and the surface of the rail 112, as well as between the rail 112 and the groove 114, when a force is applied to move the rail 112 along the displacement direction. This friction prevents the bottom plate 104 from sliding relative to the top plate 102 during normal handling of the device 100 when the device 100 is in its non-extended condition.

Figure 5B:
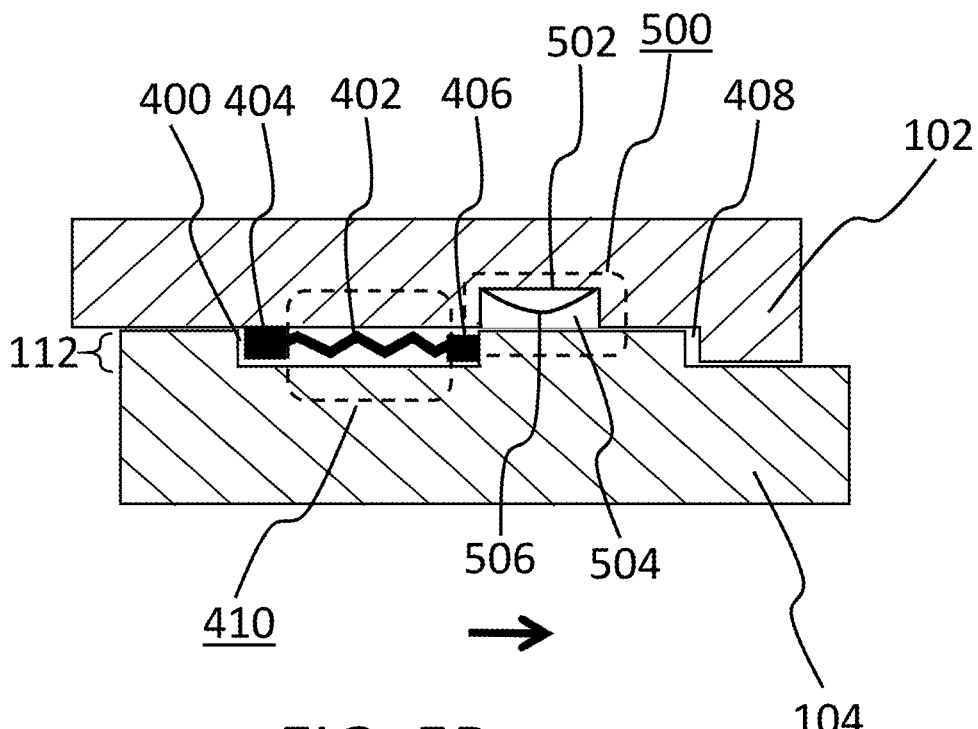
FIG. 5B is a simplified cross-sectional view showing the second control mechanism of FIG. 5A when the device is in its extended condition.
Figure 5C:
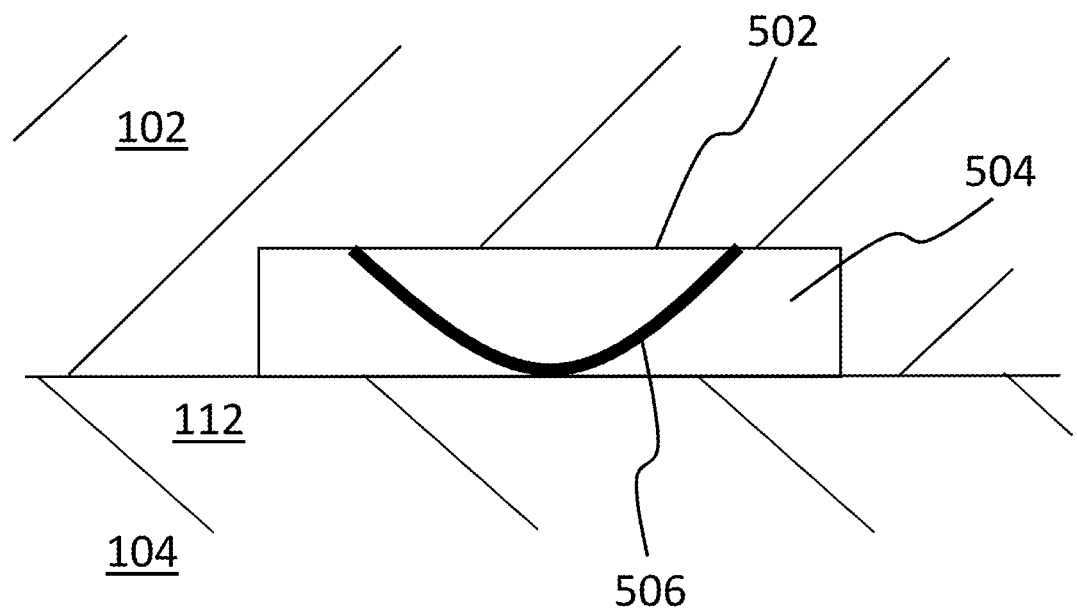
FIG. 5C shows enlarged detail of a portion of the simplified cross-section of FIG. 5A.
Figure 5D:
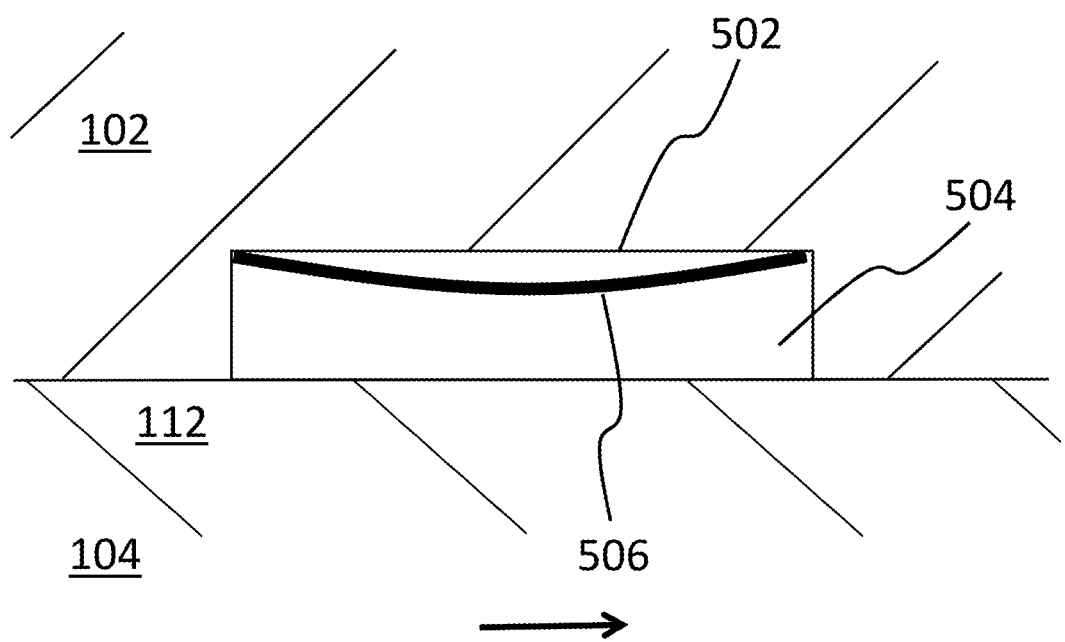
FIG. 5D shows enlarged detail of a portion of the simplified cross-section of FIG. 5B.

Referring now to FIG. 5B, after the device 100 is inserted into the wearer's mouth, body heat from the wearer is absorbed by the lock-element 506, which raises the temperature of the lock-element 506 above its transition temperature and causes the lock-element 506 to activate. Upon activating, the lock-element 506 substantially straightens such that the pressing force being applied to the rail 112 decreases, preferably to zero, and the lower plate 104 becomes unlocked and can slide freely along the displacement direction when the SMM spring 402 subsequently activates. FIG. 5C and FIG. 5D are enlarged views of the locking mechanism 500 showing more clearly the change of shape of the lock-element 506 between its "remembered" low-temperature shape in FIG. 5C and its "remembered" high-temperature shape in FIG. 5D. Preferably, the lock-element 506 is fabricated from a suitable two-way shape memory material, such that when the device 100 is removed from the wearers mouth and the lock-element 506 cools below its activation temperature, it returns to its "remembered" low-temperature shape and locks the device 100 in its non-extended condition.

6. Third Control Mechanism

Figure 6A:
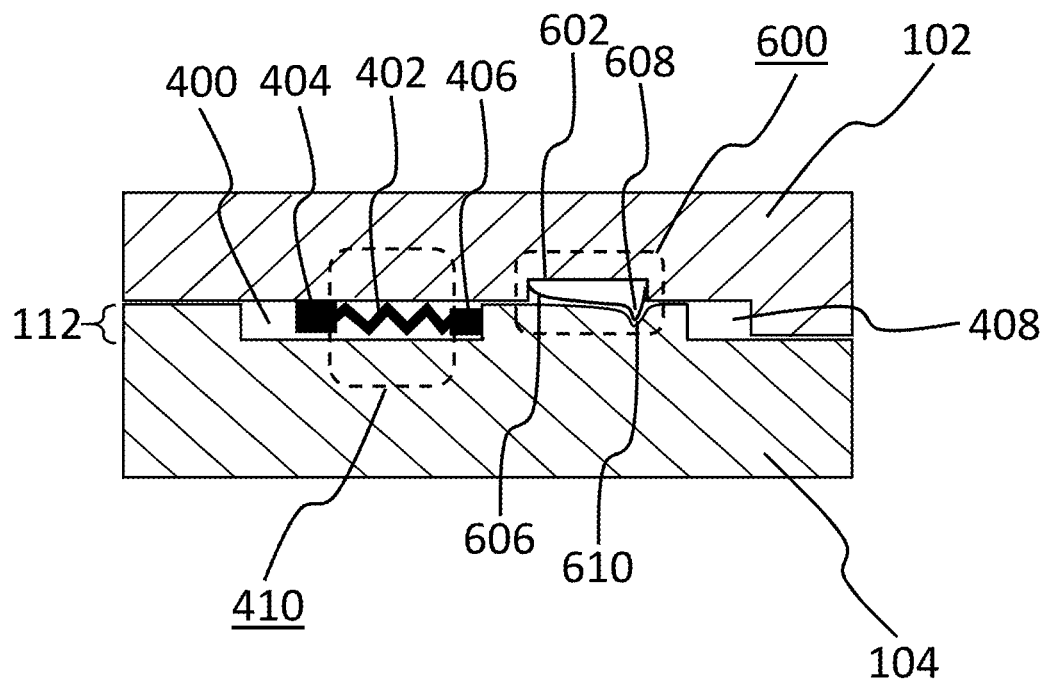
FIG. 6A is a simplified cross-sectional view taken along the line B-B in FIG. 1A and showing a third control mechanism in accordance with yet another embodiment, when the device is in its non-extended condition.
Figure 6B:
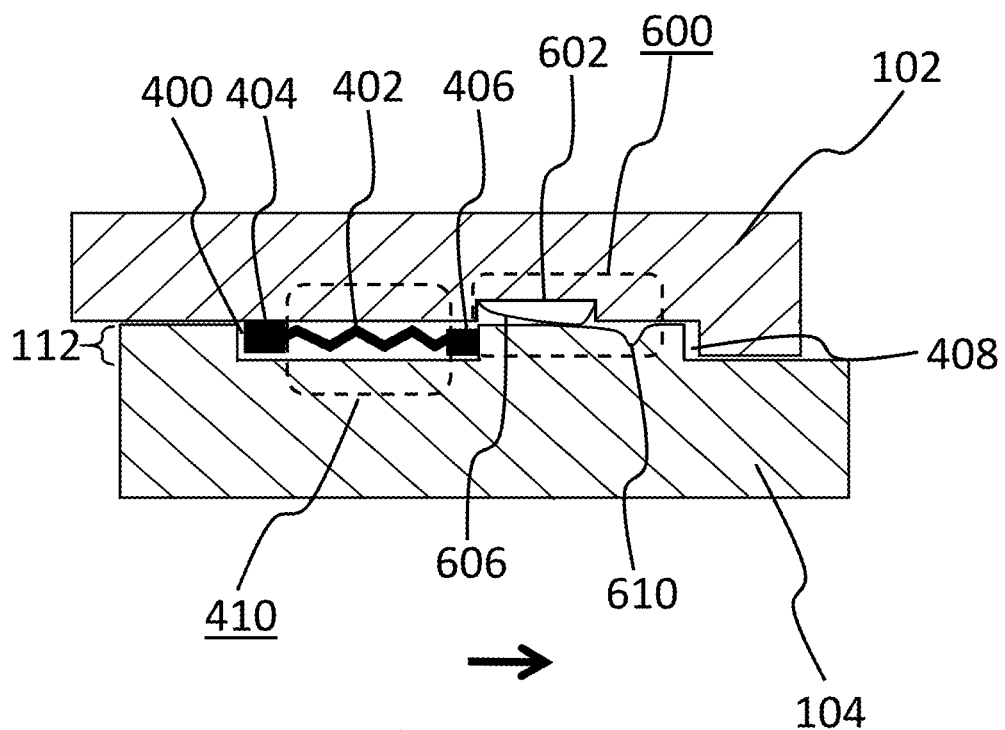
FIG. 6B is a simplified cross-sectional view showing the third control mechanism of FIG. 6A when the device is in its extended condition.

Referring now to FIG. 6A, shown is a cross-sectional view of device 100 taken along the line B-B in FIG. 1B, with a third control mechanism in accordance with an embodiment, and when the device 100 is in its non-extended condition. The elements of the third control mechanism include the same elements that have already been described with reference to FIG. 4A and FIG. 4B, and additionally include a locking mechanism shown generally at 600. During use, the locking mechanism 600 can be reset when the device 100 is returned to its non-extended condition after being worn by the wearer. When reset, i.e., in an engaged condition, the locking mechanism 600 locks the device 100 in its non-extended condition.

Figure 6C:
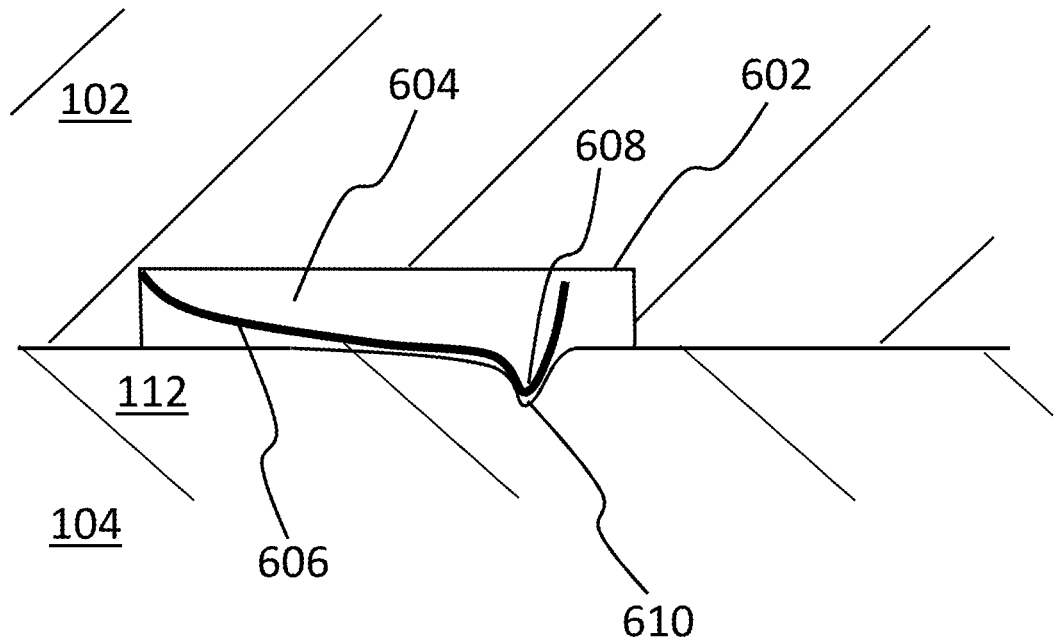
FIG. 6C shows enlarged detail of a portion of the simplified cross-section of FIG. 6A.

In this specific and non-limiting example, the locking mechanism 600 is disposed within a recess 602 that is formed in the groove 114 along the lower surface of the top plate 102. Now referring also to FIG. 6C and FIG. 6D, which show enlarged detail of the locking mechanism 600, the recess 602 provides a space 604 to accommodate a lock-element 606 formed from a SMM, such as for instance a curved piece of SMM having a tooth-feature 608 when in its "remembered" low-temperature shape. The tooth-feature 608 is received within a complementary shaped depression 610 formed along the top of rail 112. When the tooth-feature 608 is seated within depression 610, the device 100 is locked. Preferably, the locking mechanism 600 supplies a locking force that is greater than the locking force supplied by locking mechanism 500.

The lock-element 606 may be formed from the same material that is used to form SMM spring 402 or from another suitable shape memory material having an activation temperature close to average human body temperature. Optionally, the lock-element 606 is associated with a not illustrated heat-transfer control portion to provide an activation delay prior to activating, similar to the function of the already-described heat transfer portion 410. However, since the locking mechanism 600 is intended primarily to hold the device 100 in its non-extended condition only until after the device 100 has been inserted into the wearer's mouth, in most cases it is not necessary to provide an activation delay prior to activation of the lock-element 606, or at least it is not necessary to provide a wearer-specific activation delay.

Figure 6D:
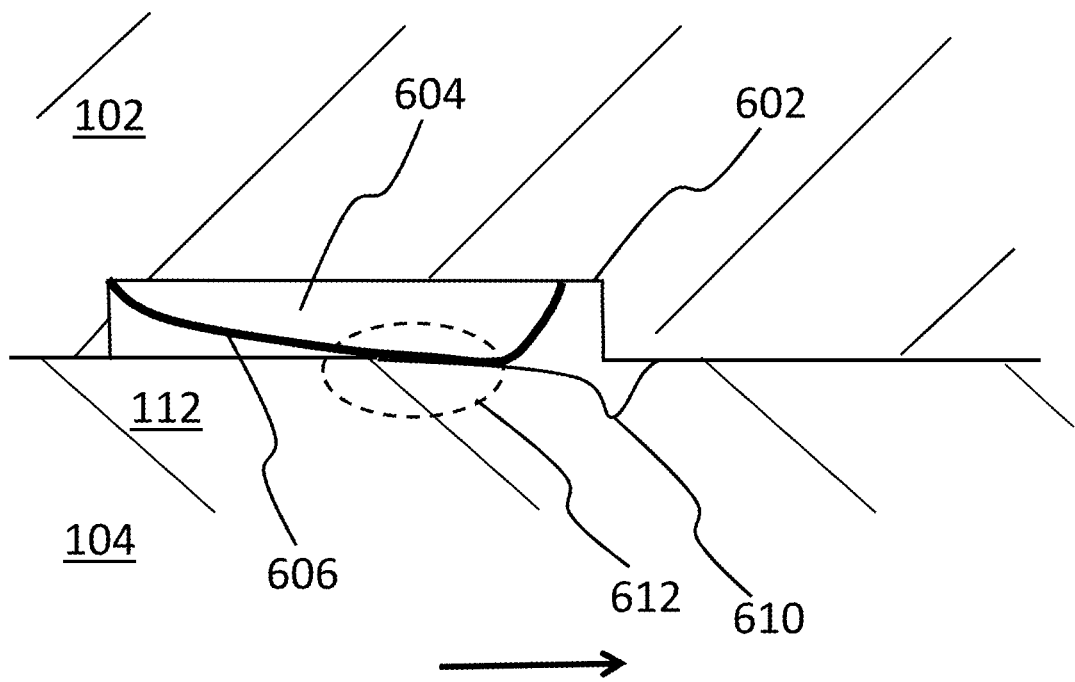
FIG. 6D shows enlarged detail of a portion of the simplified cross-section of FIG. 6B.
Figure 6E:
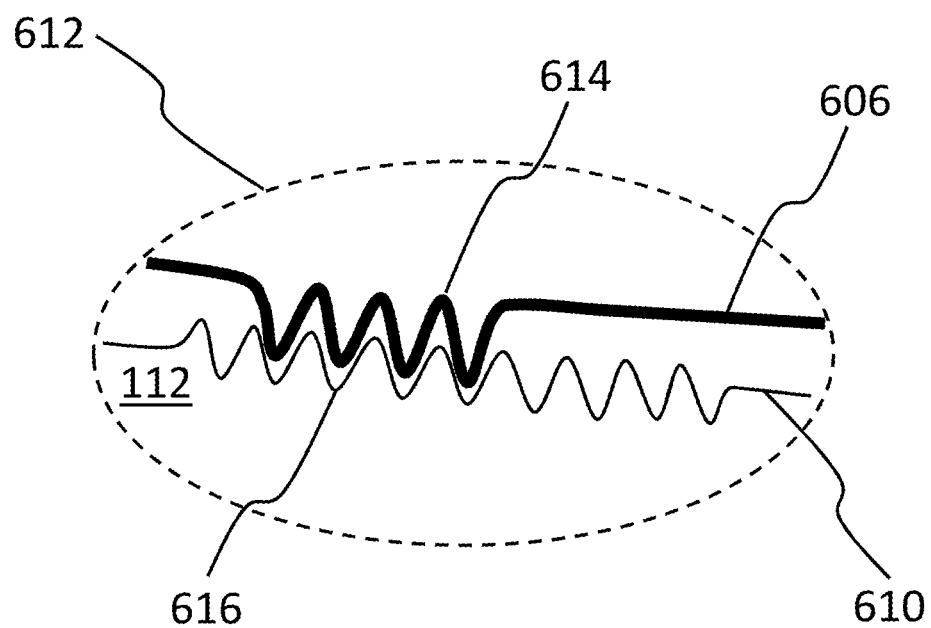
FIG. 6E shows further enlarged detail of the simplified cross-section of FIG. 6B including a ratchet-type structure.

Referring again to FIG. 6C and FIG. 6D, and now also to FIG. 6E, when the lock-element 606 is in its low-temperature shape the tooth-feature 608 seats within the depression 610 formed in the surface of rail 112 as discussed above. After being inserted into the wearer's mouth, and upon warming to its activation temperature, the shape of the lock-element 606 changes and the tooth-feature 608 "disappears" such that the shape of the lock-element 606 is more smoothly curved than when in its "remembered" low-temperature shape. This shape change unlocks the device. Optionally, as shown in FIG. 6D, the "remembered" high-temperature shape of the lock-element 606 results in contact between the lock-element 606 and the rail 112, such that a force is applied to the rail 112 that is sufficient to slow the displacement of the bottom plate 104 relative to the top plate 102, but not sufficient to prevent displacement entirely. This structure results in a less jarring change upon activation of the SMM spring 402 and thereby reduces the chance that the wearer will awaken when the device activates.

FIG. 6E shows an enlarged view of the features within the dashed line oval 612 of FIG. 6D. In particular, at least a portion of the lock-element 606 includes a fine, tooth-like structure 614 that is configured to slide against a correspondingly shaped fine, tooth-like structure 616 formed within at least a portion of the depression 610 along the surface of rail 112. The complementary fine, tooth-like structures 614 and 616 create a locking effect between the lock-element 606 and the rail 112, after the bottom plate 104 has been extended relative to the top plate 102, which prevents the bottom plate 104 from sliding backwards after it has advanced to its maximum extension position. Of course, when the device 100 is cooled after being removed from the wearer's mouth, the lock-element 606 returns to its "remembered" low temperature shape and the tooth-like structure 614 carried by the lock-element 606 either "disappears" or simply disengages from the tooth-like structure 616 formed on the at least a portion of the rail 112, which unlocks the device 100 allowing it to be reset to its non-extended condition.

7. Fourth Control Mechanism

Figure 7A:
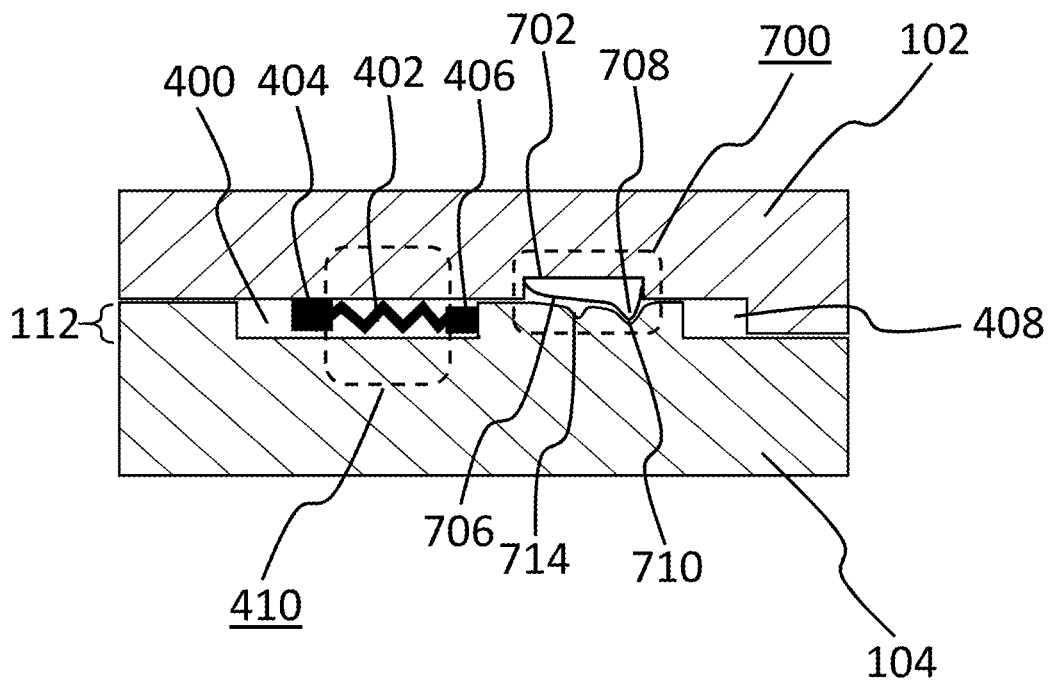
FIG. 7A is a simplified cross-sectional view taken along the line B-B in FIG. 1A and showing a fourth control mechanism in accordance with still another embodiment, when the device is in its non-extended condition.
Figure 7B:
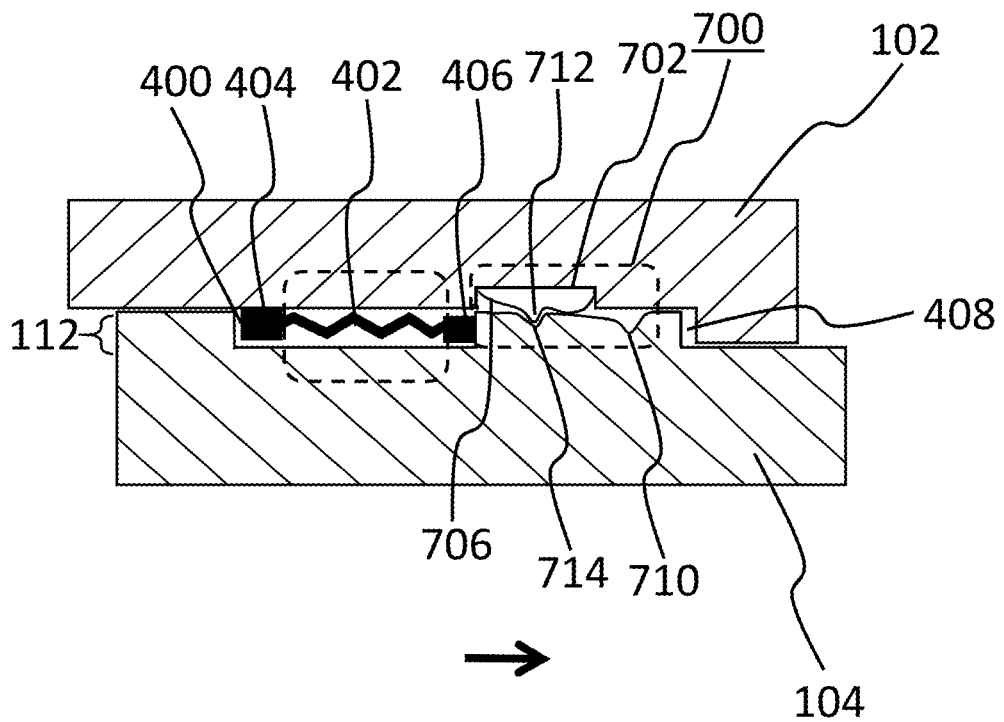
FIG. 7B is a simplified cross-sectional view showing the fourth control mechanism of FIG. 7A when the device is in its extended condition.

Referring now to FIG. 7A, shown is a cross-sectional view of device 100 taken along line B-B in FIG. 1B, with a fourth control mechanism in accordance with an embodiment, and when the device 100 is in its non-extended condition. The elements of the fourth control mechanism include the same elements that have already been described with reference to FIG. 4A and FIG. 4B, and additionally include a locking mechanism shown generally at 700. During use, the locking mechanism 700 can be reset when the device 100 is being returned to its non-extended condition after being worn by the wearer. When reset, i.e., in an engaged condition, the locking mechanism 700 locks the device 100 in its non-extended condition.

Figure 7C:
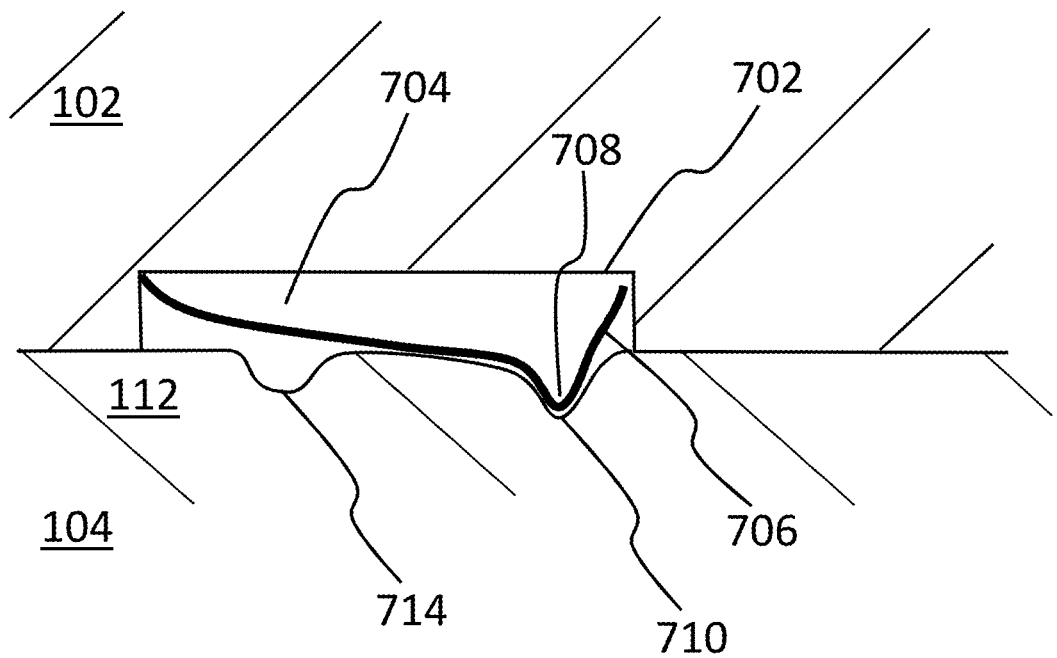
FIG. 7C shows enlarged detail of a portion of the simplified cross-section of FIG. 7A.

In this specific and non-limiting example, the locking mechanism 700 is disposed within a recess 702 that is formed in the groove 114 along the lower surface of the top plate 102. Now referring also to FIG. 7C and FIG. 7D, which show enlarged detail of the locking mechanism 700, the recess 702 provides a space 704 to accommodate a lock-element 706 formed from a SMM, such as for instance a curved piece of SMM having a tooth-feature 708 when in its "remembered" low-temperature shape. The tooth-feature 708 is received within a complementary shaped first depression 710 formed along the top of rail 112. When the tooth-feature 708 is seated within first depression 710, the device 100 is locked. The locking mechanism 700 is capable of supplying a locking force that is greater than the locking force supplied by locking mechanism 500.

After being inserted into the wearer's mouth, and upon warming to its activation temperature, the shape of the lock-element 706 changes and the tooth-feature 708 "disappears," but concomitantly a second tooth feature 712 "appears." This shape change unlocks the device 100 and allows the bottom plate 104 to slide relative to the top plate 102. When the device is in its full extended condition, the second tooth-feature 712 engages a second depression 714 formed along the top of rail 112. When the second tooth-feature 712 is seated within second depression 714, the device 100 is locked. Of course, the "remembered" high-temperature shape of the lock-element 706 should be programmed such that the second tooth-feature 712 is located at a position that allows it to seat within the second depression 714 when the device 100 is extended to the maximum extension for that particular wearer. Since the lock-element 706 is somewhat flexible, precise location of the second tooth-feature 712 is not absolutely critical.

Figure 7D:
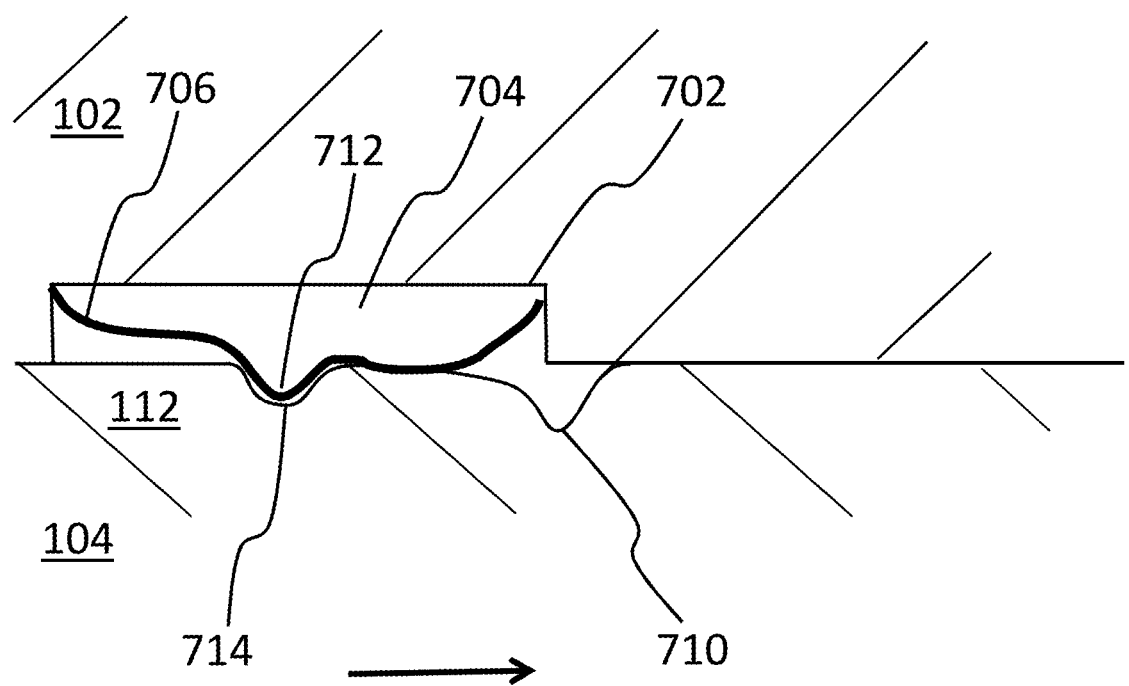
FIG. 7D shows enlarged detail of a portion of the simplified cross-section of FIG. 7B.

Optionally, as shown in FIG. 7D, the "remembered" high-temperature shape of the lock-element 706 results in contact between the lock-element 706 and the rail 112, such that a force is applied to the rail 112 that is sufficient to slow the displacement of the bottom plate 104 relative to the top plate 102, but not to prevent the displacement entirely. This structure results in a less jarring change upon activation of the SMM spring 402 and thereby reduces the chance that the wearer will awaken when the device activates.

The lock-element 706 may be formed from the same material that is used to form SMM spring 402 or from another suitable shape memory material having an activation temperature close to average human body temperature. Optionally, the lock-element 706 is associated with a not illustrated heat-transfer control portion to provide an activation delay prior to activating, similar to the function of the already-described heat transfer portion 410. However, since the locking mechanism 700 is intended primarily to hold the device 100 in its non-extended condition only until after the device 100 has been inserted into the wearer's mouth, in most cases it is not necessary to provide an activation delay prior to activation of the lock-element 706, or at least it is not necessary to provide a wearer-specific activation delay.

8. Fifth Control Mechanism

Figure 8A:
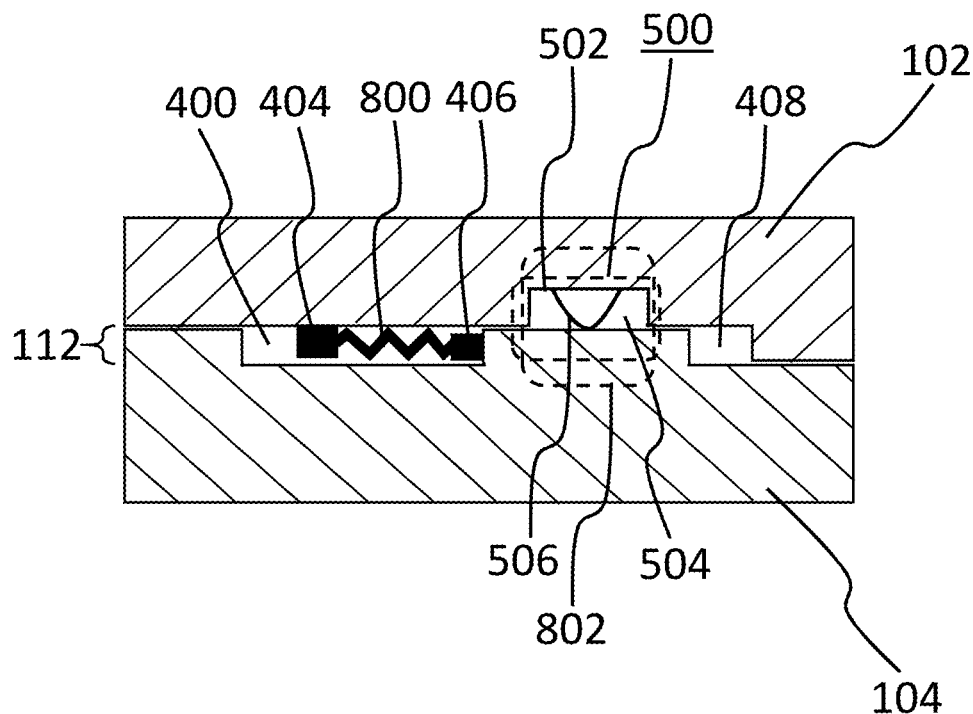
FIG. 8A is a simplified cross-sectional view taken along the line B-B in FIG. 1A and showing a fifth control mechanism in accordance with still another embodiment, when the device is in its non-extended condition.
Figure 8B:
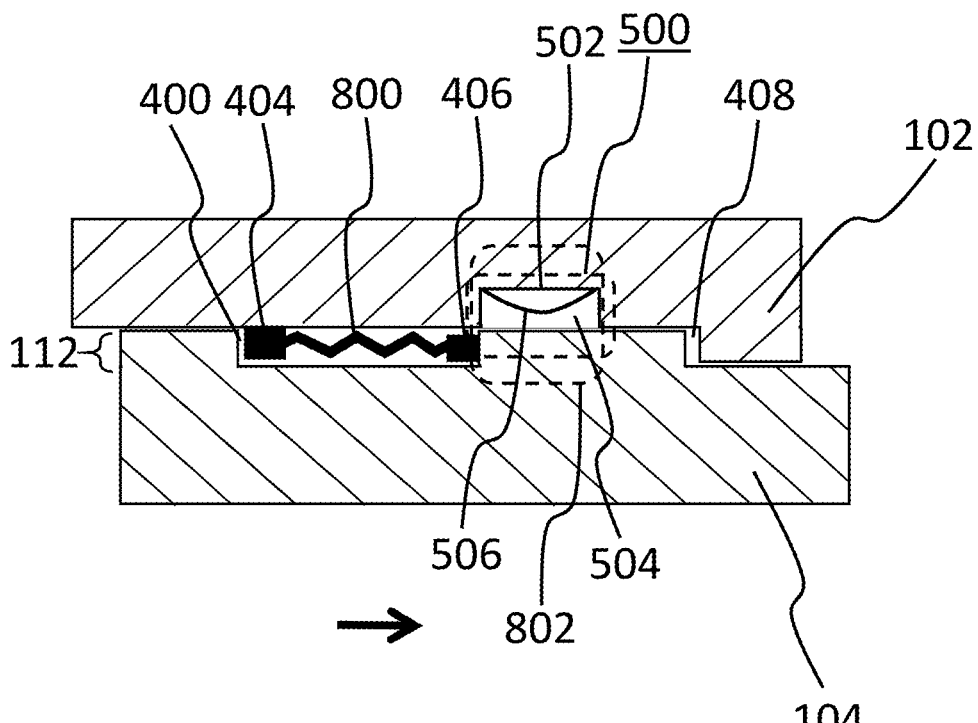
FIG. 8B is a simplified cross-sectional view showing the fifth control mechanism of FIG. 8A when the device is in its extended condition.

Referring now to FIG. 8A, shown is a cross-sectional view of device 100 taken along line B-B in FIG. 1B, with a fifth control mechanism in accordance with an embodiment, and when the device 100 is in its non-extended condition. FIG. 8B shows the device in its extended condition. The embodiment shown in FIG. 8A is substantially similar to the embodiment shown in FIG. 5A, however the SMM spring 402 of FIG. 5A has been replaced with a helical compression spring 800 that is not fabricated using a shape memory material. As such, the spring 800 provides a constant force that is trying to slide the lower plate 104 relative to the top plate 102, to move the bottom plate 102 to its extended position. The locking mechanism 500 is configured to provide a sufficiently large force to counteract the force of the spring 800 when the lock-element 506 is in its low temperature shape. As shown in FIG. 8A, the heat transfer control portion 410 used to control activation of SMM spring 402 in the embodiment of FIG. 5A is omitted, and instead a heat transfer portion 802 is provided for controlling the activation of the locking mechanism 500.

Heat transfer portion 802 may be configured similarly to heat transfer portion 410, i.e., by selecting appropriate material compositions, material thicknesses, using various fluids and/or solids etc. to control the rate at which the wearer's body heat is transferred to and absorbed by the lock-element 506. In this way, the device 100 may be configured to impose a desired activation delay after being inserted into the wearer's mouth before the lock-element 506 is warmed to its activation temperature and changes shape, thereby releasing rail 112 and allowing spring 800 to extend and displace the bottom plate 104 to its fully extended position.

Preferably, the lock-element 506 is fabricated from a suitable two-way shape memory material, such that when the device 100 is removed from the wearers mouth and the lock-element 506 cools below its activation temperature, it returns to its "remembered" low-temperature shape and locks the device 100 in its non-extended condition.

9. Sixth Control Mechanism

Figure 9A:
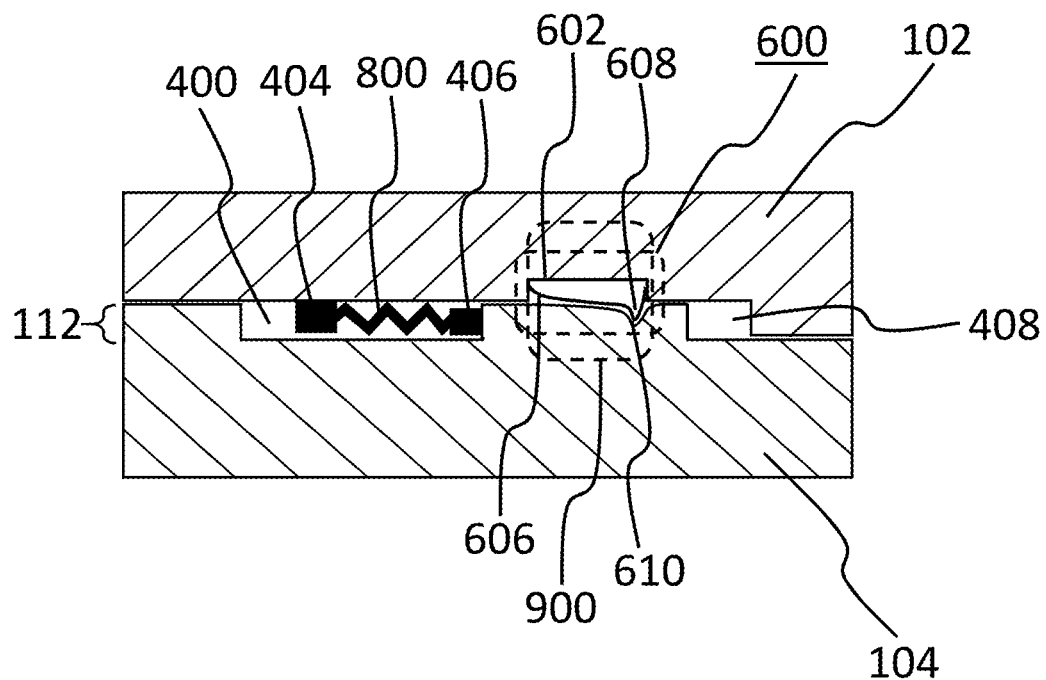
FIG. 9A is a simplified cross-sectional view taken along the line B-B in FIG. 1A and showing a sixth control mechanism in accordance with still another embodiment, when the device is in its non-extended condition.
Figure 9B:
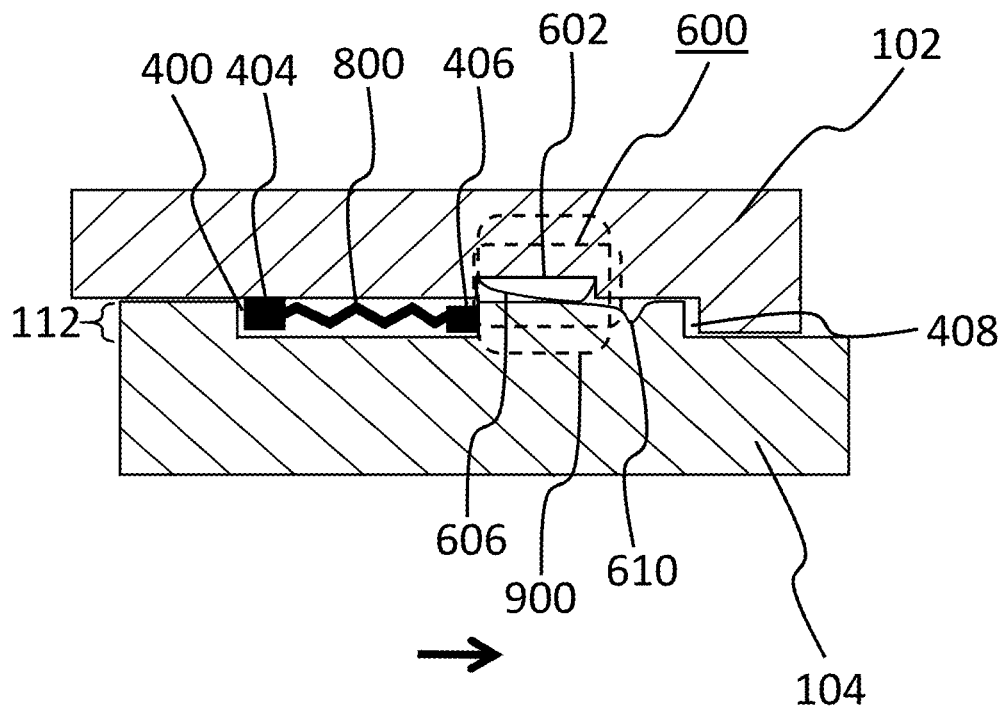
FIG. 9B is a simplified cross-sectional view showing the sixth control mechanism of FIG. 9A when the device is in its extended condition.

Referring now to FIG. 9A, shown is a cross-sectional view of device 100 taken along line B-B in FIG. 1B, with a sixth control mechanism in accordance with an embodiment, and when the device 100 is in its non-extended condition. FIG. 9B shows the device in its extended condition. The embodiment shown in FIG. 9A is substantially similar to the embodiment shown in FIG. 6A, however the SMM spring 402 of FIG. 6A has been replaced with a helical compression spring 800 that is not fabricated using a shape memory material. As such, the spring 800 provides a constant force that is trying to slide the lower plate 104 relative to the top plate 102, to move the bottom plate 102 to its extended position. The locking mechanism 600 is configured to provide a sufficiently large force to counteract the force of the spring 800 when the lock-element 606 is in its low temperature shape. As shown in FIG. 9A, the heat transfer control portion 410 used to control activation of SMM spring 402 in the embodiment of FIG. 6A is omitted, and instead a heat transfer portion 900 is provided for controlling the activation of the locking mechanism 600.

Heat transfer portion 900 may be configured similarly to heat transfer portion 410, i.e., by selecting appropriate material compositions, material thicknesses, using various fluids and/or solids etc. to control the rate at which the wearer's body heat is transferred to and absorbed by the lock-element 606. In this way, the device 100 may be configured to impose a desired activation delay after being inserted into the wearer's mouth before the lock-element 606 is warmed to its activation temperature and changes shape, thereby releasing rail 112 and allowing spring 800 to extend and displace the bottom plate 104 to its fully extended position. The lock-element 606 may Optionally, as discussed above with reference to FIG. 6D, the "remembered" high-temperature shape of the lock-element 606 may be configured to result in contact between the lock-element 606 and the rail 112, such that a force is applied to the rail 112 that is sufficient to slow the displacement of the bottom plate 104 relative to the top plate 102, but not sufficient to prevent displacement entirely. This structure results in a less jarring change upon activation of the lock-element 606 and release of the stored potential energy in spring 800, and thereby reduces the chance that the wearer will awaken when the device activates.

Preferably, the lock-element 606 is fabricated from a suitable two-way shape memory material, such that when the device 100 is removed from the wearers mouth and the lock-element 606 cools below its activation temperature, it returns to its "remembered" low-temperature shape and locks the device 100 in its non-extended condition.

10. Seventh Control Mechanism

Figure 10A:
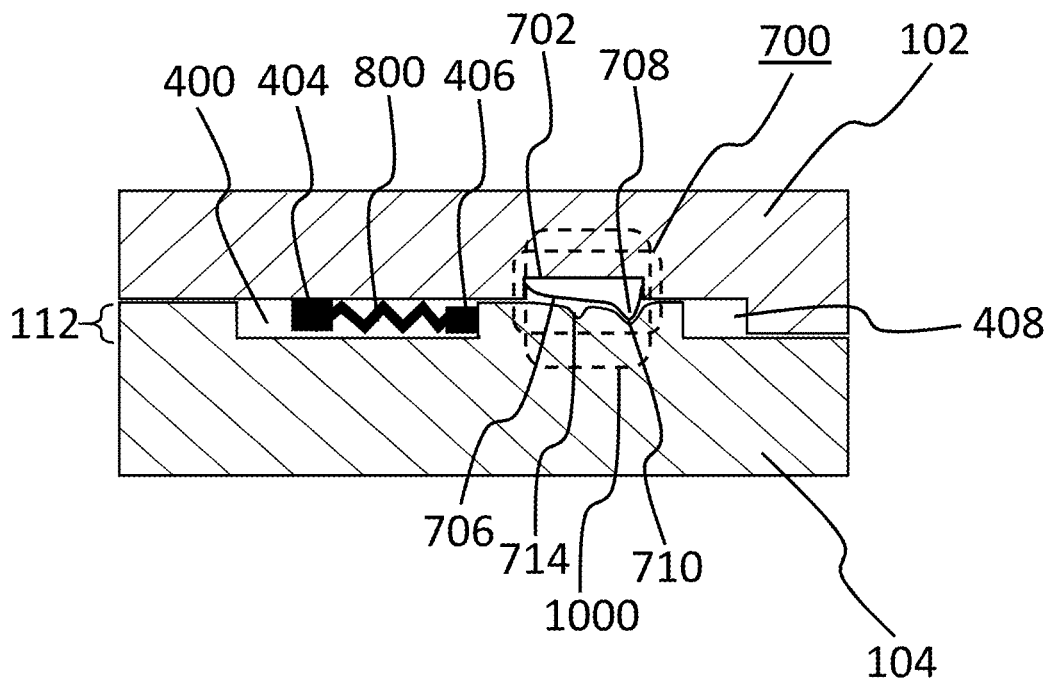
FIG. 10A is a simplified cross-sectional view taken along the line B-B in FIG. 1A and showing a seventh control mechanism in accordance with still another embodiment, when the device is in its non-extended condition.
Figure 10B:
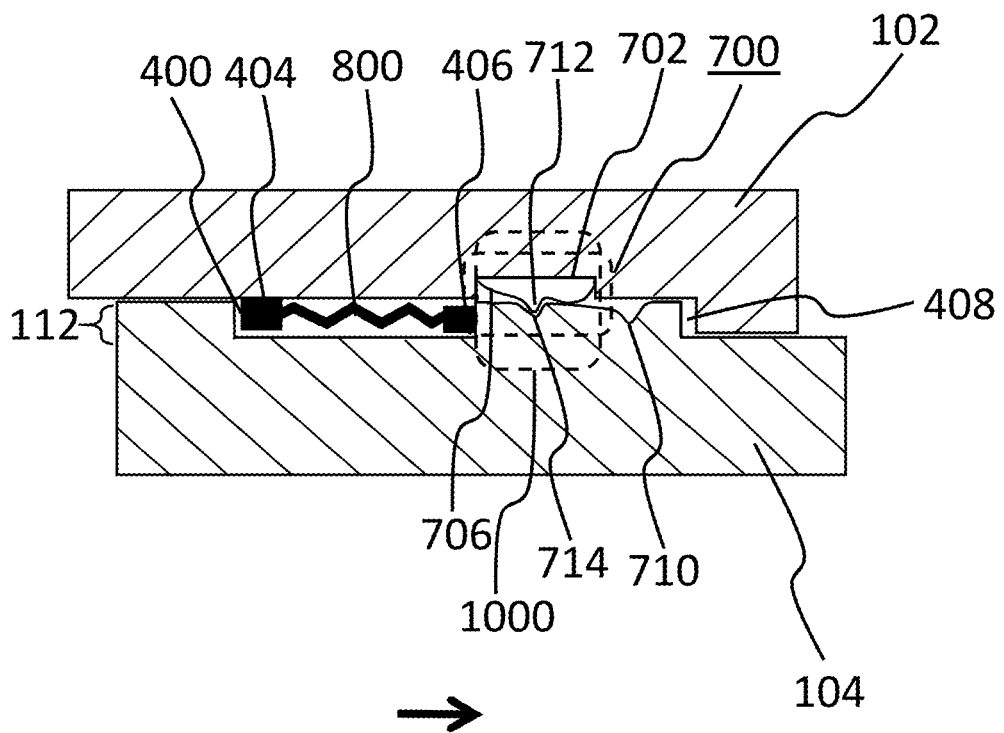
FIG. 10B is a simplified cross-sectional view showing the seventh control mechanism of FIG. 10A when the device is in its extended condition.

Referring now to FIG. 10A, shown is a cross-sectional view of device 100 taken along line B-B in FIG. 1B, with a seventh control mechanism in accordance with an embodiment, and when the device 100 is in its non-extended condition. FIG. 10B shows the device in its extended condition. The embodiment shown in FIG. 10A is substantially similar to the embodiment shown in FIG. 7A, however the SMM spring 402 of FIG. 7A has been replaced with a helical compression spring 800 that is not fabricated using a shape memory material. As such, the spring provides a constant force that is trying to slide the lower plate 104 relative to the top plate 102, to move the bottom plate 102 to its extended position. The locking mechanism 700 is configured to provide a sufficiently large force to counteract the force of the spring 800 when the lock-element 706 is in its low temperature shape. As shown in FIG. 10A, the heat transfer control portion 410 used to control activation of SMM spring 402 in the embodiment of FIG. 7A is omitted, and instead a heat transfer portion 1000 is provided for controlling the activation of the locking mechanism 700.

Heat transfer portion 1000 may be configured similarly to heat transfer portion 410, i.e., by selecting appropriate material compositions, material thicknesses, using various fluids and/or solids etc. to control the rate at which the wearer's body heat is transferred to and absorbed by the lock-element 706. In this way, the device 100 may be configured to require a desired activation delay after being inserted into the wearer's mouth before the lock-element is warmed to its activation temperature and changes shape, thereby releasing rail 112 and allowing spring 800 to extend and displace the bottom plate 104 to its fully extended position.

Optionally, the "remembered" high-temperature shape of the lock-element 706 results in contact between the lock-element 706 and the rail 112, such that a force is applied to the rail 112 that is sufficient to slow the displacement of the bottom plate 104 relative to the top plate 102, but not to prevent the displacement entirely. This structure results in a less jarring change upon activation of the lock-element 706 and thereby reduces the chance that the wearer will awaken when the device activates.

Preferably, the lock-element 706 is fabricated from a suitable two-way shape memory material, such that when the device 100 is removed from the wearers mouth and the lock-element 706 cools below its activation temperature, it returns to its "remembered" low-temperature shape and locks the device 100 in its non-extended condition.

11. Heat Transfer Control Portion

As discussed in the preceding sections, the heat transfer control portion 410 used to control the rate of heat transfer from the wearer to the SMM spring 402, and equivalently the heat transfer control portion 802, 900 or 1000 used to control the rate of heat transfer from the wearer to the lock-element 506, 606 or 706, may be provided in the form of a flexible, liquid-tight polymer such as polyvinylidene chloride, i.e., a plastic film/membrane. FIGS. 11A-11H and 12A-12D explicitly depict the heat transfer control portion 410, but the same principles may also be applied to the heat transfer control portion 802, 900 or 1000.

Figure 11A:
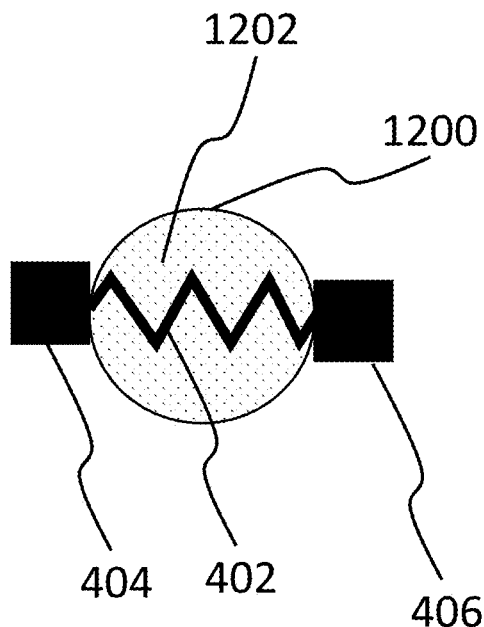
FIG. 11A is a simplified diagram showing a heat transfer control portion configured to contain a shape memory material (SMM) spring and a heat transfer control gas, prior to warming the SMM spring to its activation temperature.
Figure 11B:
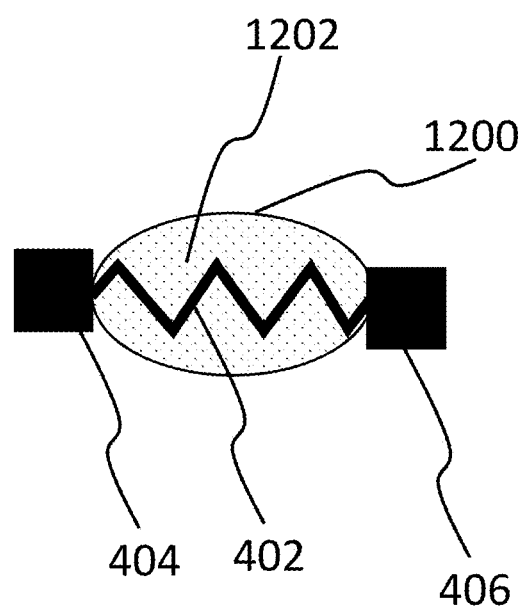
FIG. 11B is a simplified diagram showing the heat transfer control portion of FIG. 11A after warming the SMM spring to its activation temperature.
Figure 11C:
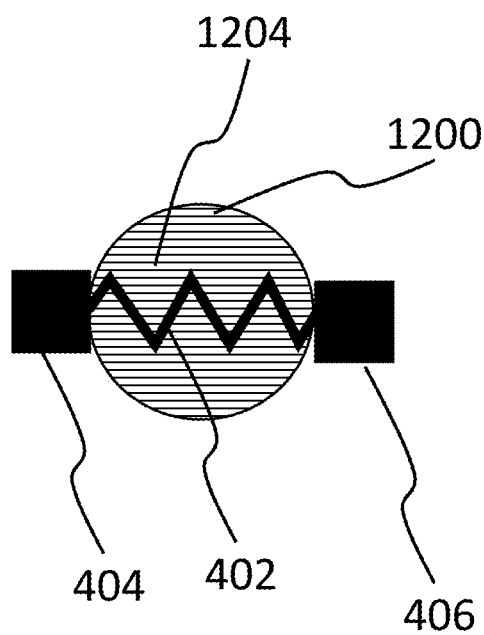
FIG. 11C is a simplified diagram showing a heat transfer control portion configured to contain a shape memory material (SMM) spring and a heat transfer control liquid, prior to warming the SMM spring to its activation temperature.
Figure 11D:
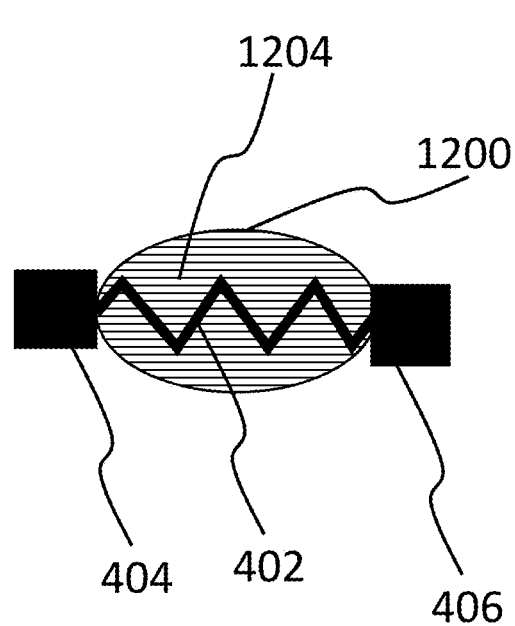
FIG. 11D is a simplified diagram showing the heat transfer control portion of FIG. 11C after warming the SMM spring to its activation temperature.
Figure 11E:
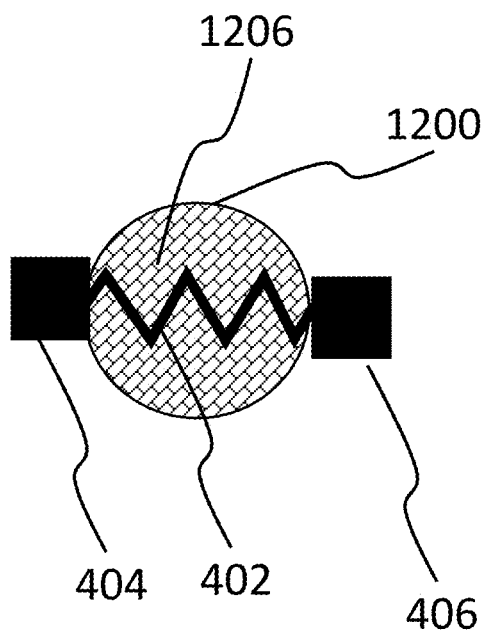
FIG. 11E is a simplified diagram showing a heat transfer control portion configured to contain a shape memory material (SMM) spring and a heat transfer control gel, prior to warming the SMM spring to its activation temperature.
Figure 11F:
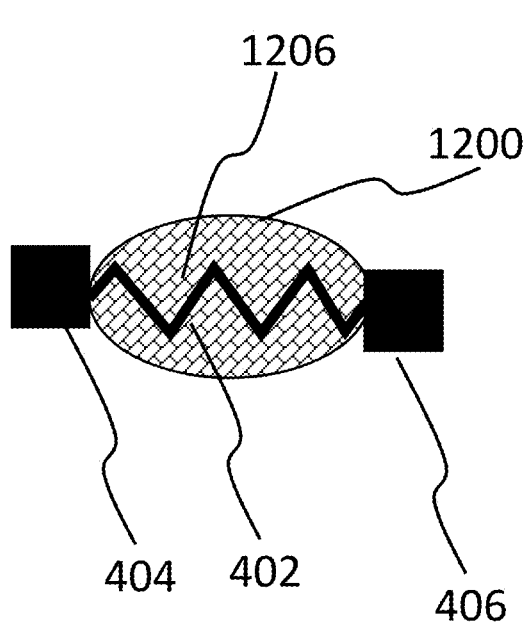
FIG. 11F is a simplified diagram showing the heat transfer control portion of FIG. 11E after warming the SMM spring to its activation temperature.
Figure 11G:
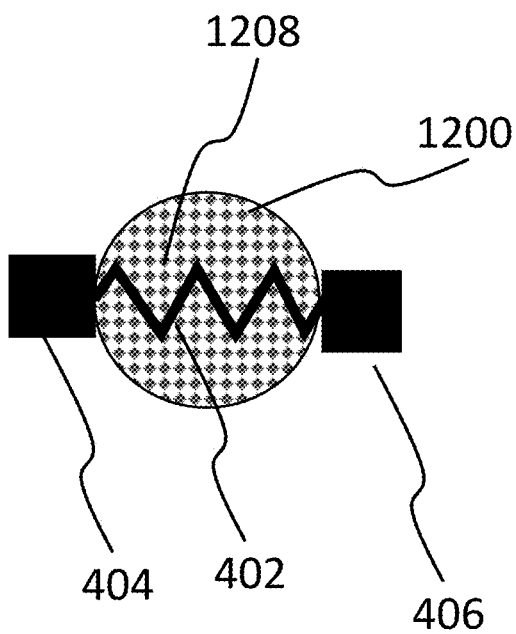
FIG. 11G is a simplified diagram showing a heat transfer control portion configured to contain a shape memory material (SMM) spring and an insulation material, prior to warming the SMM spring to its activation temperature.
Figure 11H:
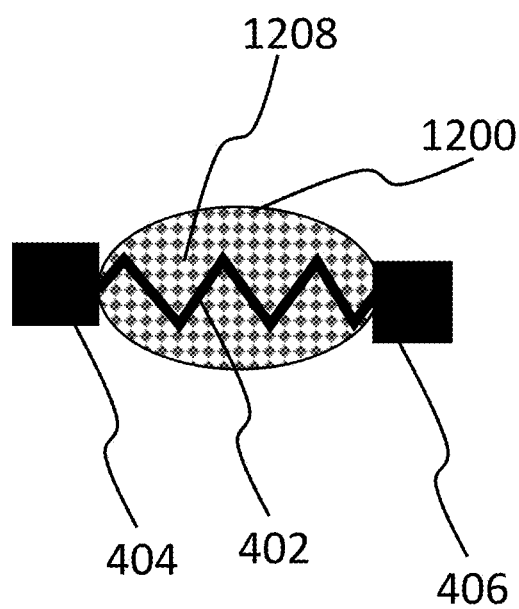
FIG. 11H is a simplified diagram showing the heat transfer control portion of FIG. 11G after warming the SMM spring to its activation temperature.
Figure 12A:
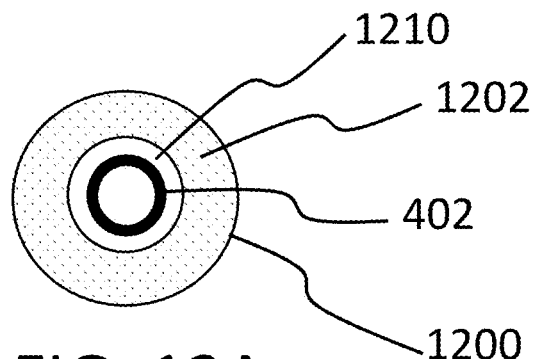
FIG. 12A is a simplified diagram showing a heat transfer control portion configured to contain a heat transfer control gas and having a central passageway for accommodating a shape memory material (SMM) spring.
Figure 12B:
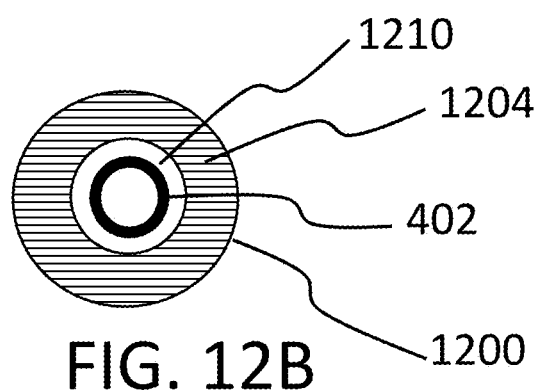
FIG. 12B is a simplified diagram showing a heat transfer control portion configured to contain a heat transfer control liquid and having a central passageway for accommodating a shape memory material (SMM) spring.
Figure 12C:
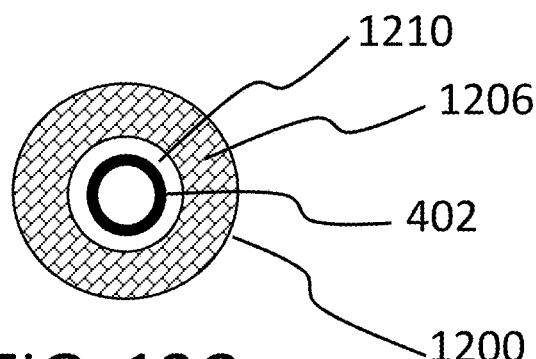
FIG. 12C is a simplified diagram showing a heat transfer control portion configured to contain a heat transfer control gel and having a central passageway for accommodating a shape memory material (SMM) spring.
Figure 12D:
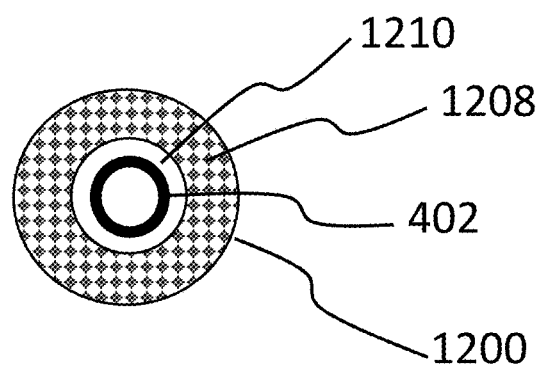
FIG. 12D is a simplified diagram showing a heat transfer control portion configured to contain an insulation material and having a central passageway for accommodating a shape memory material (SMM) spring.

FIGS. 11A, 11C, 11E, and 11G are simplified diagrams showing a heat transfer control portion 410 comprising a flexible film/membrane 1200 configured to contain a shape memory material (SMM) spring 402 and a heat transfer control gas 1202 in FIG. 11A, a heat transfer control liquid 1204 in FIG. 11C, a heat transfer control gel 1206 in FIG. 11E, and a solid insulator material 1208 such as for instance Styrofoam® beads in FIG. 12G. The heat transfer control portion 410 in each case is shown in a condition prior to warming the SMM spring 402 to its activation temperature.

FIGS. 11B, 11D, 11F and 11H are simplified diagrams showing the heat transfer control portion 410 of FIGS. 11A, 11C, 11E, and 11G, respectively, in a condition after warming the SMM spring 402 to its activation temperature. In this specific example, the SMM spring 402 elongates upon activation and the flexible film/membrane 1200 changes shape.

In each case, the flexible film/membrane 1200 is coupled to the attachment points 404 and 406 in a fluid-tight fashion. Various methods for forming suitable fluid-tight connections are known in the art.

An alternative configuration of the heat transfer control portion 410 is shown in FIGS. 12A-12D, in which the flexible film/membrane 1200 forms a tube-shaped enclosure with a central passage 2010 within which the SMM spring 402 is received. The enclosure containing a heat transfer control gas 1202 in FIG. 12A, a heat transfer control liquid 1204 in FIG. 12B, a heat transfer control gel 1206 in FIG. 12C, and a solid insulator material 1208 such as for instance Styrofoam® beads in FIG. 12D.

Figure 13:
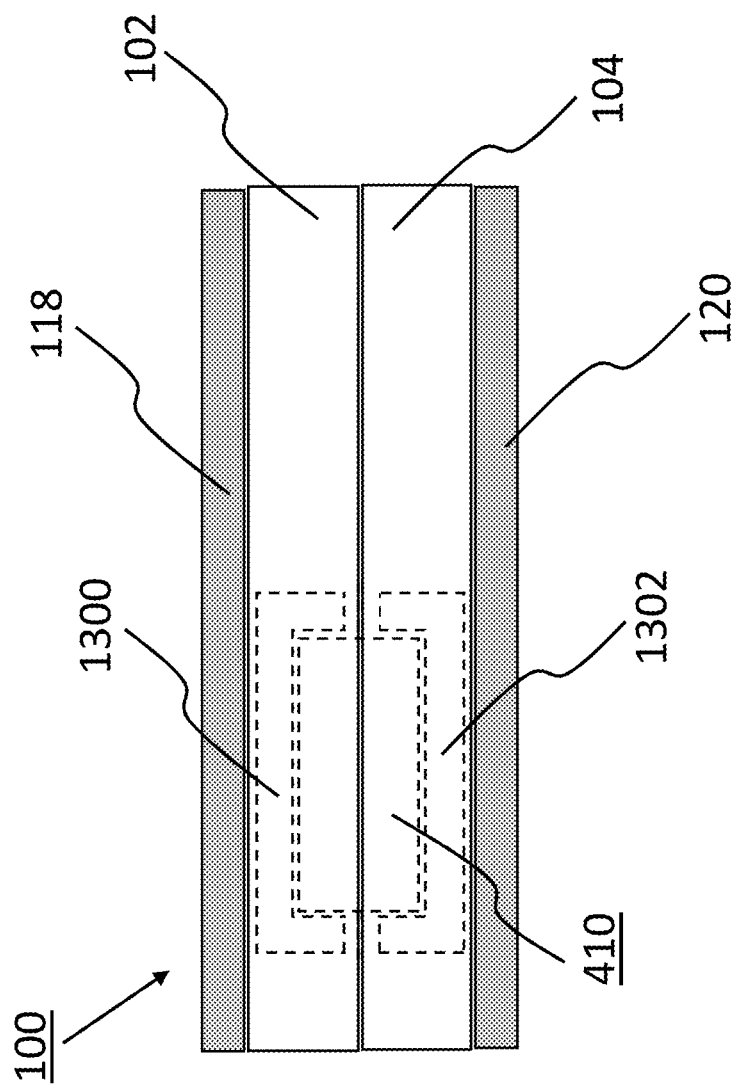
FIG. 13 is a simplified side view showing the device of FIG. 1A with a heat transfer control portion including placement of additional thermal material.

FIG. 13 is a simplified diagram showing yet another alternative configuration of device 100. As shown in FIG. 13, the heat transfer control portion described previously may be at least partially surrounded or shielded by additional thermal material 1300 and 1302 disposed between the SMA spring 402 (not shown in FIG. 13) and the exterior surfaces of the device 100 which come into contact with portions of the wearer's mouth. The thermal material 1300 and/or 1302 have a material composition and/or material thickness etc. that is selected to provide a desired activation delay. The additional thermal material 1300 and 1302 may be a solid, liquid or gas, or combinations thereof. Optionally, the additional thermal material 1300 and/or 1302 is user changeable, for allowing the wearer to make fine adjustments to the delay time without the need to return the device to be professionally adjusted.

Throughout the description and claims of this specification, the words "comprise," "including," "having" and "contain" and variations of the words, for example "comprising" and "comprises" etc., mean "including but not limited to," and are not intended to, and do not exclude other components.

The terminology used herein is for the purpose of describing particular embodiments only and is not intended to be limiting. As used in the specification and the appended claims, the singular forms "a" "and" and "the" include plural references unless the context clearly dictates otherwise.

For the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

It will be appreciated that variations to the foregoing embodiments of the disclosure can be made while still falling within the scope of the disclosure. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the disclosure are applicable to all aspects of the disclosure and may be used in any combination. Likewise, features described in non-essential combinations may be used separately (not in combination).

What is claimed is:

1. A configurable time-delayed oral mandible displacement device, comprising:
   a top member and a bottom member, the bottom member slidably coupled to the top member for movement between a non-extended position and an extended position; and
   a control mechanism coupled between the top member and the bottom member, the control mechanism comprising:
      an element fabricated from a shape memory material; and
      a heat-transfer control portion providing configurability by variation of a characteristic thereof for controllably selecting a duration of an activation time delay during which a temperature of the element fabricated from the shape memory material is configured to increase to an activation temperature thereof by absorbing body heat from a human wearer after the configurable time-delayed oral mandible displacement device is inserted into a mouth of the human wearer,
      wherein the element fabricated from shape memory material is a lock-element, wherein the lock-element locks the bottom member in the non-extended position when the temperature of the lock-element is below the activation temperature thereof, and wherein the lock-element changes shape when heated to the activation temperature for unlocking the bottom member.

2. The device of claim 1, further comprising a spring disposed between the top member and the bottom member, wherein the spring provides a force that is directed to displace the bottom member, relative to the top member, from the non-extended position to the extended position.

3. The device of claim 2, wherein the force provided by the spring is insufficient to overcome a locking force provided by the lock-element prior to the lock-element changing shape upon heating to the activation temperature thereof and unlocking the bottom member.

4. The device of claim 1, wherein the change of shape of the lock-element is other than directed along a direction for providing a force to displace the bottom member, relative to the top member, from the non-extended position to the extended position.

5. The device of claim 1, wherein the characteristic of the heat-transfer control portion is at least one of a composition and a thickness of a material that is disposed between the element fabricated from the shape memory material and one or more internal surfaces of the mouth of the human wearer.

6. The device of claim 1, wherein the heat-transfer control portion comprises a flexible container configured to contain the element fabricated from the shape memory material within an internal volume thereof, the internal volume further containing at least one of a gas other than air, a liquid, a gel, and a solid heat transfer control material.

7. The device of claim 1, wherein the heat-transfer control portion comprises a flexible container configured to form a double-walled structure with a central passageway for receiving the element fabricated from the shape memory material therein, the double-walled structure forming an internal volume that contains at least one of a gas other than air, a liquid, a gel, and a solid heat transfer control material.

8. The device of claim 1, wherein the shape memory material is selected from a shape memory alloy, a shape memory polymer and a shape change polymer.

9. The device of claim 1, wherein the element fabricated from the shape memory material is encased by or is embedded in a thermal material selected to reduce a rate of warming of the shape memory material compared to a rate of warming absent the thermal material.

10. The device of claim 1, wherein the activation temperature is between 35° C. and 40° C.

11. A configurable time-delayed oral mandible displacement device, comprising:
   a top member and a bottom member, the bottom member slidably coupled to the top member for movement between a non-extended position and an extended position; and
   a control mechanism coupled between the top member and the bottom member, the control mechanism comprising:
      an element fabricated from a shape memory material, wherein the element is a spring disposed between the top member and the bottom member and wherein the spring changes shape when heated to an activation temperature thereof to provide a force that is directed to displace the bottom member, relative to the top member, from the non-extended position to the extended position; and a heat-transfer control portion providing configurability by variation of a characteristic thereof for controllably selecting a duration of an activation time delay during which a temperature of the element fabricated from the shape memory material is configured to increase to the activation temperature thereof by absorbing body heat from a human wearer after the configurable time-delayed oral mandible displacement device is inserted into a mouth of the human wearer; and a lock-element fabricated from a shape memory material and being disposed between the top member and the bottom member, wherein the lock-element locks the bottom member in the non-extended position when a temperature of the lock-element is below an activation temperature thereof, and wherein the lock-element is configured to change shape when heated to the activation temperature by absorbing body heat from the human wearer, for unlocking the bottom member from the non-extended position.

12. The device of claim 11, wherein upon cooling below the activation temperature the element fabricated from the shape memory material changes shape a second time to provide a second force that is directed to displace the bottom member, relative to the top member, from the extended position back to the non-extended position without additional force being applied from outside of the configurable time-delayed oral mandible displacement device.

13. The device of claim 11, wherein the characteristic of the heat-transfer control portion is at least one of a composition and a thickness of a material that is disposed between the element fabricated from the shape memory material and one or more internal surfaces of the mouth of the human wearer.

14. The device of claim 11, wherein the heat-transfer control portion comprises a flexible container configured to contain the element fabricated from the shape memory material within an internal volume thereof, the internal volume further containing at least one of a gas other than air, a liquid, a gel, and a solid heat transfer control material.

15. The device of claim 11, wherein the heat-transfer control portion comprises a flexible container configured to form a double-walled structure with a central passageway for receiving the element fabricated from the shape memory material therein, the double-walled structure forming an internal volume that contains at least one of a gas other than air, a liquid, a gel, and a solid heat transfer control material.

16. The device of claim 11, wherein the shape memory material is selected from a shape memory alloy, a shape memory polymer and a shape change polymer.

17. The device of claim 11, wherein the element fabricated from the shape memory material is encased by or is embedded in a thermal material selected to reduce a rate of warming of the shape memory material compared to a rate of warming absent the thermal material.

18. The device of claim 11, wherein the activation temperature is between 35° C. and 40° C.

19. A configurable time-delayed oral mandible displacement device, comprising:

a top member and a bottom member, the bottom member slidably coupled to the top member for movement between a non-extended position and an extended position; and a control mechanism coupled between the top member and the bottom member, the control mechanism comprising:

an element fabricated from a shape memory material; and a heat-transfer control portion providing configurability by variation of a characteristic thereof for controllably selecting a duration of an activation time delay during which a temperature of the element fabricated from the shape memory material is configured to increase to an activation temperature thereof by absorbing body heat from a human wearer after the configurable time-delayed oral mandible displacement device is inserted into a mouth of the human wearer; and a screw-adjustment mechanism for setting a maximum displacement of the bottom member relative to the top member when the bottom member is in the extended position.

20. The device of claim 19, wherein the element fabricated from the shape memory material changes shape when heated to the activation temperature to provide a force that is directed to displace the bottom member, relative to the top member, from the non-extended position to the extended position, and wherein upon cooling below the activation temperature the element fabricated from the shape memory material changes shape a second time to provide a second force that is directed to displace the bottom member, relative to the top member, from the extended position back to the non-extended position without additional force being applied from outside of the configurable time-delayed oral mandible displacement device.

21. The device of claim 19, wherein the characteristic of the heat-transfer control portion is at least one of a composition and a thickness of a material that is disposed between the element fabricated from the shape memory material and one or more internal surfaces of the mouth of the human wearer.

22. The device of claim 19, wherein the heat-transfer control portion comprises a flexible container configured to contain the element fabricated from the shape memory material within an internal volume thereof, the internal volume further containing at least one of a gas other than air, a liquid, a gel, and a solid heat transfer control material.

23. The device of claim 19, wherein the heat-transfer control portion comprises a flexible container configured to form a double-walled structure with a central passageway for receiving the element fabricated from the shape memory material therein, the double-walled structure forming an internal volume that contains at least one of a gas other than air, a liquid, a gel, and a solid heat transfer control material.

24. The device of claim 19, wherein the shape memory material is selected from a shape memory alloy, a shape memory polymer and a shape change polymer.

25. The device of claim 19, wherein the element fabricated from the shape memory material is encased by or is embedded in a thermal material selected to reduce a rate of warming of the shape memory material compared to a rate of warming absent the thermal material.

26. The device of claim 19, wherein the activation temperature is between 35° C. and 40° C.

* * * * *